(12) United States Patent
Povsner et al.

(10) Patent No.: US 12,282,904 B2
(45) Date of Patent: Apr. 22, 2025

(54) USER AND INTERMEDIARY IMPLEMENTATION MECHANISMS FOR DIGITAL CURRENCIES

(71) Applicant: NATIONAL CURRENCY TECHNOLOGIES, INC., Ashburn, VA (US)

(72) Inventors: Joshua M. Povsner, Ashburn, VA (US); Duncan Parker, Richmond, VA (US)

(73) Assignee: NATIONAL CURRENCY TECHNOLOGIES, INC., Ashburn, VA (US)

( * ) Notice: Subject to any disclaimer, the term of this patent is extended or adjusted under 35 U.S.C. 154(b) by 68 days.

(21) Appl. No.: 18/276,997

(22) PCT Filed: Feb. 9, 2022

(86) PCT No.: PCT/US2022/015845
§ 371 (c)(1),
(2) Date: Aug. 11, 2023

(87) PCT Pub. No.: WO2022/173850
PCT Pub. Date: Aug. 18, 2022

(65) Prior Publication Data
US 2024/0119428 A1    Apr. 11, 2024

Related U.S. Application Data

(60) Provisional application No. 63/304,684, filed on Jan. 30, 2022, provisional application No. 63/294,732, (Continued)

(51) Int. Cl.
*G06Q 20/06* (2012.01)
*G06Q 20/38* (2012.01)

(52) U.S. Cl.
CPC ....... *G06Q 20/0655* (2013.01); *G06Q 20/389* (2013.01); *G06Q 2220/10* (2013.01)

(58) Field of Classification Search
CPC ............. G06Q 20/0655; G06Q 20/389; G06Q 2220/10; G06Q 20/06; G06Q 20/065;
(Continued)

(56) References Cited

U.S. PATENT DOCUMENTS

2010/0023878 A1\* 1/2010 Douris ................ H04L 12/6418
715/757
2015/0170112 A1  6/2015 DeCastro
(Continued)

FOREIGN PATENT DOCUMENTS

CN    105279864 A  \* 1/2016  ............. G06Q 40/12
EP    1903757 A1  \* 3/2008  ........... G06Q 10/107

OTHER PUBLICATIONS

Osbakk et al.: Ubiquitous Computing in Public, 2005, PERMID, Computer Science, pp. 1-4 (Year: 2005).\*
(Continued)

*Primary Examiner* — Bijendra K Shrestha
(74) *Attorney, Agent, or Firm* — VOLENTINE, WHITT & FRANCOS, PLLC

(57) ABSTRACT

An electronic communication device (ECD) includes a memory that stores software instructions; and a processor that executes the software instructions. When executed by the processor, the software instructions cause the ECD to: generate and send formatted inquiries and formatted instructions for virtual notes of a national digital currency to a central system that tracks all instances of virtual notes of the national digital currency; and receive responses to the formatted inquiries and confirmations of the formatted instructions from the central system if the formatted inquiries and formatted instructions comply with a predetermined format
(Continued)

required by the central system to process the formatted inquiries and formatted instructions.

10 Claims, 15 Drawing Sheets

Related U.S. Application Data filed on Dec. 29, 2021, provisional application No. 63/240,964, filed on Sep. 5, 2021, provisional application No. 63/209,989, filed on Jun. 12, 2021, provisional application No. 63/173,631, filed on Apr. 12, 2021, provisional application No. 63/148,335, filed on Feb. 11, 2021.

(58) Field of Classification Search
CPC . H04L 9/0891; H04L 9/0894; H04L 63/0245; H04L 63/10; H04L 63/123; H04L 2209/56; H04L 9/50
See application file for complete search history.

(56) References Cited

U.S. PATENT DOCUMENTS

| | | |
|---|---|---|
| 2017/0046664 A1 | 2/2017 | Haldenby et al. |
| 2017/0132620 A1 | 5/2017 | Miller et al. |
| 2018/0253702 A1 | 9/2018 | Dowding |

OTHER PUBLICATIONS

SCS Smart Card Service: TellME7—Cross Paltform Software for Self-Service Devices, 2017, pp. 1-16 (Year: 2017).*
International Search Report and Written Opinion, dated May 24, 2022, for PCT No. PCT/US2022/015845, 5 pgs.

* cited by examiner

| HEADER 24 | | | VN COUNT 8 | VN ORIGIN ID 8 | PARTY #1 ID 8 | PARTY #2 ID 8 | VN #1 ID 8 |
|---|---|---|---|---|---|---|---|
| VN #2 ID 8 | VN #3 ID 8 | VN #4 ID 8 | VN #5 ID 8 | VN #6 ID 8 | VN #7 ID 8 | VN #8 ID 8 | VN #9 ID 8 |
| VN #10-ID 8 | VN #11-ID 8 | VN #11-ID 8 | VN #13-ID 8 | VN #14-ID 8 | VN #15-ID 8 | VN #16-ID 8 | SFIOI TYPE 8 |

⋮

| RESERVED FOR STATUS UPDATING AT SECURITY GATEWAY SYSTEM 64 |
|---|

FIG.1C

PARTY ID

| NATION(S) | STATE/REGION | TYPE | ID NUMBER |
|---|---|---|---|

| VALUE | UNIQUE ID |
| --- | --- |
| SOURCE INDICATION | NOTIFICATION INSTRUCTION |

| VALUE | ENCRYPTED UNIQUE ID |
| --- | --- |
| SOURCE INDICATION | NOTIFICATION INSTRUCTION |

| ENCRYPTED VALUE AND UNIQUE ID ||
| --- | --- |
| SOURCE INDICATION | NOTIFICATION INSTRUCTION |

| ENCRYPTED VALUE, UNIQUE ID, SOURCE IDENTIFICATION AND NOTIFICATION INSTRUCTION |
| --- |

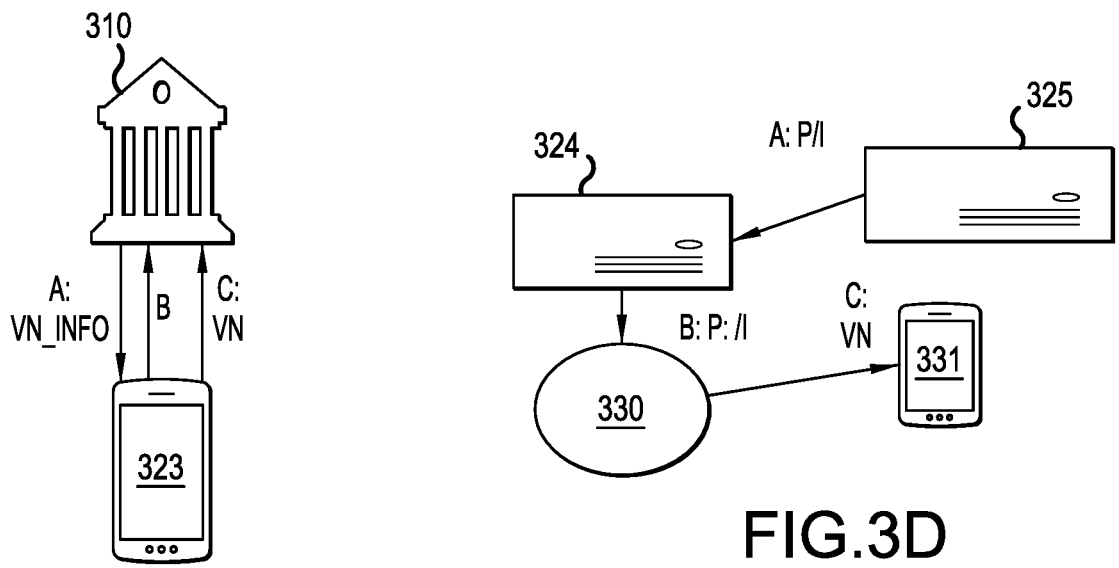
FIG.3C
FIG.3D
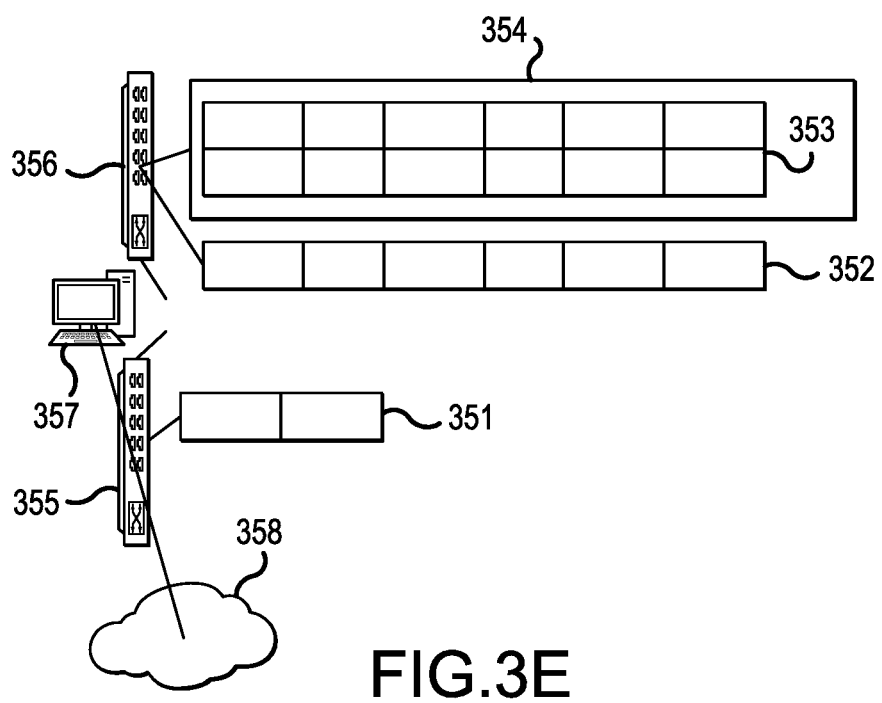
FIG.3E

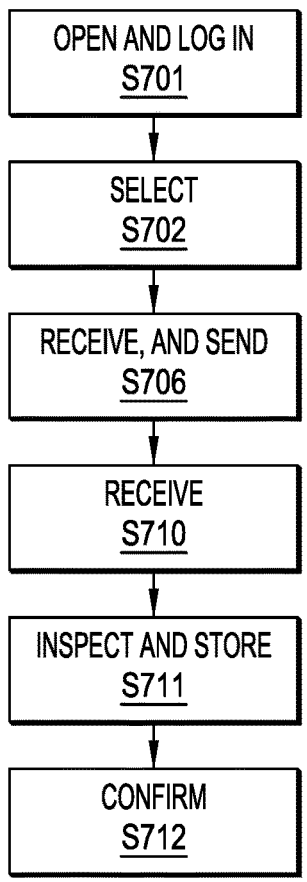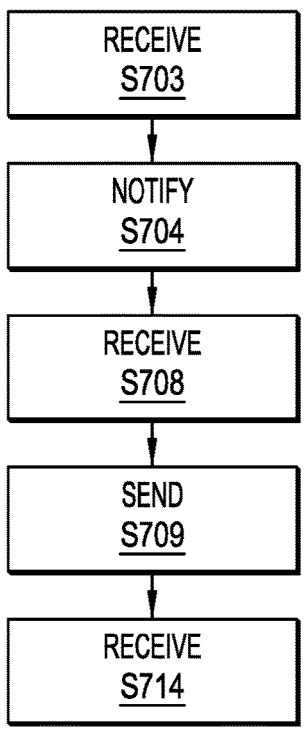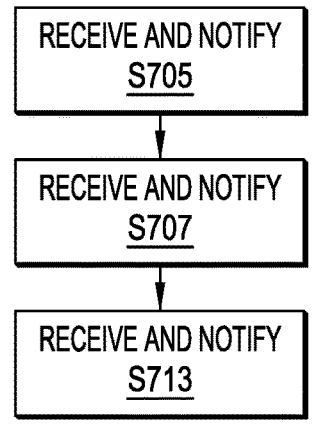
FIG.7A
FIG.7B
FIG.7C
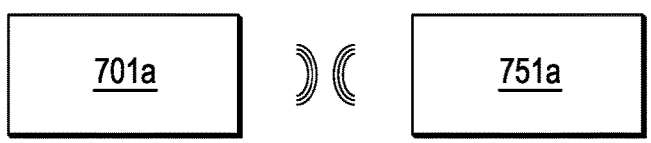
FIG.7D
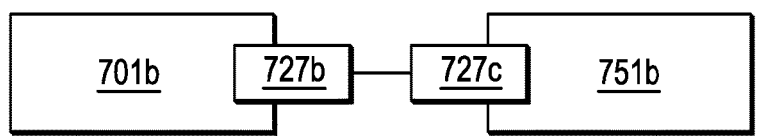
FIG.7E

USER AND INTERMEDIARY IMPLEMENTATION MECHANISMS FOR DIGITAL CURRENCIES

CROSS REFERENCE TO RELATED APPLICATIONS

This patent application claims priority to U.S. provisional application No. 63/148,335, filed Feb. 11, 2021, to U.S. provisional application No. 63/173,631, filed Apr. 12, 2021, to U.S. provisional application No. 63/209,989, filed Jun. 12, 2021, to U.S. provisional application No. 63/240,964, filed Sep. 5, 2021, to U.S. provisional application No. 63/294,732, filed Dec. 29, 2021, and to U.S. provisional application No. 63/304,684, filed Jan. 30, 2022, which are all herby incorporated by reference in their entireties.

BACKGROUND

National digital currencies (NDCs) are potentially useful to supplement or replace national physical currencies. Some proposals for NDCs are based on encrypted digital bearer instruments, but without any form of ledger. Private currencies often use distributed ledger technology (DLT), and DLT has also been proposed in the context of NDCs. For a variety of reasons such as safety, efficiency and utility, these are inappropriate for use in implementing NDCs.

BRIEF DESCRIPTION OF THE DRAWINGS

Example embodiments are best understood from the following detailed description when read in context with the accompanying drawing figures, in which:

FIG. 1C illustrates an example format for a SFIOI; FIG. 1D illustrates a format for a party identification;

FIG. 2A, FIG. 2B, FIG. 2C and FIG. 2D illustrate different layouts of VNs.

FIG. 3A, FIG. 3B, FIG. 3C and FIG. 3D illustrate different communication flows for custodial handling for VNs; FIG. 3E illustrates a segregated and selectively shielded memory system for storing VNs;

FIG. 7A illustrates a method of withdrawing VNs from an account to an ECD; FIG. 7B illustrates a method of facilitating withdrawal of VNs by a bank; FIG. 7C illustrates a method of a central system confirming a transfer of VNs from a bank to an ECD; FIG. 7D illustrates a system for storing VNs in an accessory to an ECD; FIG. 7E illustrates another system for storing VNs in an accessory to an ECD.

DETAILED DESCRIPTION

In the following detailed description, for purposes of explanation and not limitation, representative embodiments disclosing specific details are set forth in order to provide a thorough understanding of the representative embodiments according to the present teachings. However, other embodiments consistent with the present disclosure may depart from specific details disclosed herein. Descriptions of known systems, devices, methods of operation and methods of manufacture may be omitted so as to avoid obscuring the description of the representative embodiments. Nonetheless, systems, devices and methods that are within the purview of one of ordinary skill in one or more of the numerous arts relevant to the present teachings are within the scope of the present teachings and may be used in accordance with the representative embodiments. The defined terms are in addition to the technical and scientific meanings of the defined terms as commonly understood and accepted in the technical field of the present teachings.

Minimum requirements for implementing an NDC include that each virtual note (VN) of the NDC include a unique ID (unique identification) and a denomination. If centralized tracking is to be used to implement NDCs, a central system must interface with the public, and for efficiency and safety purposes should only accept one or very few predefined format(s) for incoming communications. Inquiries and instructions to a central system may be provided as short, formatted inquiries or instructions (SFIOIs) which require minimal information including at least the unique ID of each VN specified in the SFIOI and a unique ID for each party involved in whatever is communicated in the SFIOI. VNs and SFIOIs may be packetized and communicated over packet-switched networks that switch packets in accordance with transmission control protocol/internet protocol (TCP-IP) and/or user datagram protocol (UDP-IP).

Figure 1A:
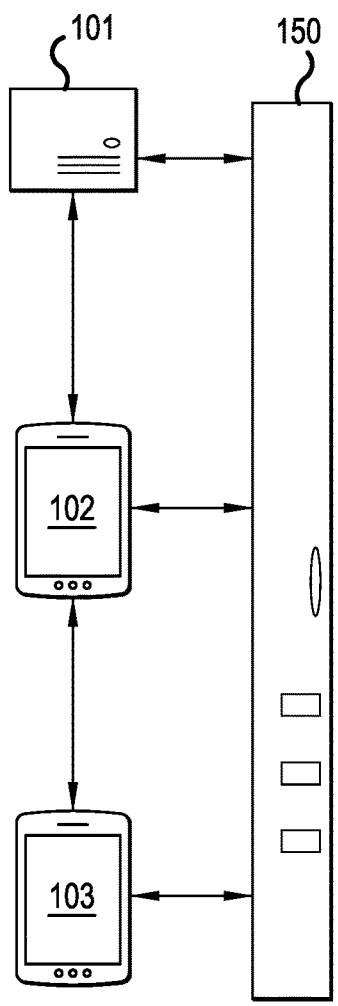
FIG. 1A illustrates tracking virtual notes (VNs) of NDCs.

In tracking VNs as shown in FIG. 1A, transaction requesters and/or transaction counterparties send SFIOIs to an internet protocol (IP) address of a central system 150 to inquire as to ownership of VNs or to provide instructions such as to transfer ownership of VNs. In FIG. 1A, ECDs (electronic communication devices) include a first ECD 101, a second ECD 102 and a third ECD 103. Transaction requesters and/or transaction counterparties may send the SFIOIs. For example, transaction requesters may provide verification information to transaction counterparties uniquely identifying the transaction requesters so that the counterparties may present the verification information to the central system 150, and the central system 150 can assume that the transaction requesters have assented to transfer a VN since there is a very low risk that a counterparty can guess that any particular party is the owner of record for any particular VN. Encryption may be fully or partially used, such as when a transaction requester provides an encrypted unique ID for a VN to the counterparty for the counterparty to check with the central system 150, and the counterparty obtains the unencrypted unique ID for the VN only after the central system 150 confirms to the counterparty that the VN belongs to the transaction requester. In some embodiments, transaction requesters may proactively notify the central system 150 that VNs will be transferred. Verification information that may be provided by requesting parties in transactions may include unique communication addresses, unique IDs of program instantiations of programs used by the parties, unique account numbers of accounts assigned to the parties, unique device identifications of ECDs used by the parties, unique personal identifications assigned to the parties by governments, and other forms of unique information that may be uniquely correlated to parties.

SFIOIs require proper formatting, and one way to impose compliance with requirements for proper formatting is to encourage usage of authorized CRPs and/or EWPs. ECDs may store and execute CRPs, EWPs and/or other programs that interact with or otherwise process VNs to coordinate the centralized tracking by the central system 150. The first ECD 101, the second ECD 102 and the third ECD 103 may each store and execute an appropriate CRP and/or EWP which is centrally registered by the central system 150, and provided with a unique ID. For example, detection and reporting of movement of the VN may be reported by CRPs and/or EWPs installed on ECDs. The CRP or EWP may be automatically triggered whenever a dedicated storage area for VNs is accessed to store or retrieve VNs. The CRP or EWP may check whether the VN is newly received by the ECD when the CRP or EWP is triggered by a storage operation, and when the VN is newly received, the CRP or EWP may report the movement via a SFIOI. The CRP or EWP may check whether the VN is newly transmitted by the ECD when the CRP or EWP is triggered by a retrieve operation, and when the VN is newly transmitted, the CRP or EWP may report the movement via the SFIOI. CRPs and/or EWPs may also be configured to initiate contact with the central system 150 periodically and/or when an internet connection is available after being unavailable. The executable program may simply initiate a report of the current location of all VNs on an ECD.

Additionally, CRPs and EWPs may be provided with anti-hacking mechanisms, either alone or in conjunction with operating systems for ECDs that have the CRPs installed thereon. For instance, if a CRP or EWP is modified without authorization, the CRP or EWP may be automatically deactivated and reported to the central system 150. Additionally, if a CRP or EWP is used to attempt to modify a read-only VN, the CRP or EWP may be automatically deactivated and reported to the central system 150. Additionally, if an operating system detects that an unauthorized CRP or EWP is attempting to modify a VN, the operating system may report the unauthorized CRP or EWP and/or the VN to the central system 150. In some embodiments, an attempt to modify a read-only VN may result in changing the value of one bit or values of a small number of bits in the VN that are checked when a VN is first read, so that a previous attempt to modify the read-only VN may be detected and reported to the central system 150 the next time the VN is read by a CRP or EWP. For example, the bit(s) that are modified when tampering is detected may be at a predetermined location that is checked as one of the first tasks when a VN is read.

SFIOIs may be generated by the programs stored and executed on the ECDs. Unique IDs for parties in a SFIOI may be specified in as few as 5 bytes. Identification of the nations issuing the unique IDs for parties may be built into the unique IDs for parties, so that unique IDs may be used for different central systems. Unique IDs for VNs in a SFIOI may be specified in as few as five bytes. For example, four bits (e.g., the first four bits) of five full bytes may be used to specify any of up to sixteen denominations for VNs with the remaining thirty six bits specifying almost 69 billion different unique IDs for VNs of any particular denomination.

Figure 1B:
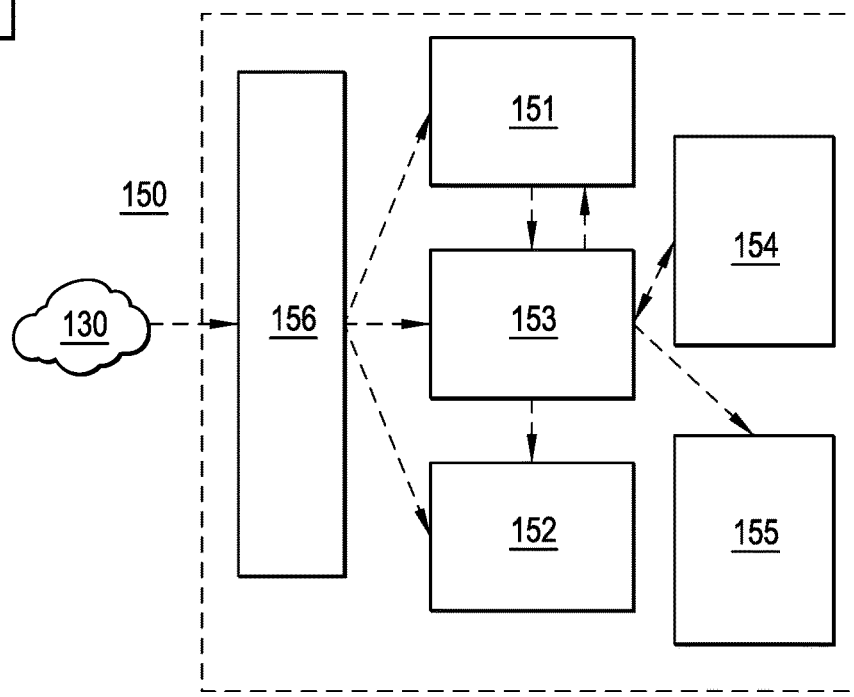
FIG. 1B illustrates a functional network layout for a central system.

In the functional network layout for a central system in FIG. 1B, a security gateway system 156 is used as an interface between the public and other elements of the central system 150. That is, the central system 150 may be configured to receive packets from any ECD in the world connected to the internet via the security gateway system 156, and without necessarily requiring any particular CRP, EWP, or type of ECD. The central system 150 includes the security gateway system 156, an ID management system 151, a ledger storage system 152, a main memory system 153, an artificial intelligence and analytics system 154, and a backup memory system 155.

The ID management system 151 may be used to store and update records for parties authorized to use the NDC tracked by the central system 150. The ledger storage system 152 is used to maintain records of current ownership of all VNs issued through the central system 150, and may be used to quickly track and verify ownership of VNs specified in SFIOIs. The main memory system 153 is used to store most or all types of records for the NDC, and may be distributed such as by record type. The artificial intelligence and analytics system 154 performs analytics for the central system 150. The backup memory system 155 may be switched on so that functionality of the main memory system 153 is switched to the backup memory system 155. The security gateway system 156 may include servers assigned to handle incoming SFIOIs. The security gateway system 156 may be the only public interface for the central system 150 in terms of processing of SFIOIs, and may be implemented without publishing any domain name, any email address, any telephone number or any other way to communicate other than the designated IP address(es). Interaction between the ECDs and the central system 150 may be limited to SFIOIs.

An intermediate system (not shown) may be provided between the central system 150 and ECDs so that the intermediate system can retrieve settings for parties from the central system 150, allow the parties to update the settings, and then provide the updated settings to the central system 150. Parties may be enabled to change forms of verification information associated with their ownership of VNs. In some embodiments, parties may be enabled to select a form of verification information to be used to confirm ownership of VNs.

In the example format for a SFIOI in FIG. 1C, multiple different fields include information expected for processing by a central system 150, and specifically by at least a security gateway system 156. The format should address concerns that the SFIOI must be quickly processable, must be safely processable, must not consume too much time, processing resources, memory resources, or bandwidth resources. Every byte in the SFIOI may be reserved in the format for specific purposes. A variety of types of information may be specified at the byte or word level for a format for a SFIOI. Security for SFIOIs may be enhanced by banning sequences of packets in transmission control protocol, such as by ensuring that no packets with a sequence higher than zero (effectively higher than one packet) is routed to or accepted by a security gateway system as introduced in FIG. 1B. The bar on large sequences may be set higher than one packet, such as at two packets or three packets. When sequences greater than one packet are banned, the SFIOIs may be sent from ECDs by UDP, non-sequential TCP, or any other form of unsequenced communications which are otherwise packetized according to IP protocol.

In FIG. 1C, a header for an IP packet is shown to include 24 bytes, or 3 64-bit/8-byte words. Some bytes may be specifically left open with the expectation that the values in these bytes will always be 0 (zero). The first field after the header is for a VN count, and this count is provided a full 8 bytes/64-bits even though the VN count itself may be limited to something like 7, 13, 19 or another small number of maximum VNs per packet. The VN count may be processed at the security gateway system 156 to ensure that the VN ID field(s) in the SFIOI which include substantive data match the VN count. Next, a first party ID field and a second party ID field are each provided with 8 bytes/64-bits. In this way, each of the first party ID field and the second party ID field may be read as entire words by the appropriate threads that perform security checks for the first party ID field and the second party ID field. As an example, the first part ID field may always require the party ID of the purported owner of VNs listed in the SFIOI, as a check of knowledge of ownership of the VNs may be a requirement for any inquiry or instruction acceptable to the central system 150. Next, 16 separate fields are each provided as full words to specify 16 VNs. In this way, each thread assigned to perform security checks for the VNs may read the corresponding VNs as entire words, even if the unique ID for each VN is provided in fewer than 8 bytes. For example, unique IDs for VNs may include a first byte for country/region code, a second byte for denomination, and six more bytes for the actual unique ID for that denomination issued by that country/region. Afterwards, the last substantive field is for a type of the SFIOI. The type of SFIOIs may be processed last, such as when the SFIOIs are each subject to the same safety processing regardless of type. Security checks may be performed before processing the field for the type of the SFIOI. The final fields for the SFIOI shown in FIG. 1C are left empty. So long as the number of VNs allowed to be specified in a packet is maintained at or under a maximum limit, even a 128-byte or 256-byte format for a SFIOI may be appropriate to handle processing at the security gateway system 156. Other sizes for formats for a SFIOI may be logically appropriate, such as depending on types of predefined memory sizes and arrangements used at a security gateway system 156. For example, SFIOIs may be allowed to have different sizes, though ad-hoc sizes for SFIOIs would not be optimal The best mode for implementing such SFIOIs is to specify a format that leverages standardized memory sizes for ubiquitous memory types such as flash memory, standard instruction sizes for modern processors such as 64-bit words, and so on.

In some embodiments, another field for a SFIOI may also specify the total amount involved in a transaction, the amount of change (i.e., less than a $1.00 amount) involved in a transaction, or another amount. For example, in the event that small denominations are not issued for VNs or are otherwise not tracked by a central system, a SFIOI may still specify the amount of change to be credited and/or debited from accounts corresponding to the party identifications. In this way, the format for SFIOIs may still accommodate transfers involving denominations which are not issued as VNs, or which are not otherwise tracked by the central system.

The format shown in FIG. 1C is only an example, and formats may be changed in many ways and still be consistent with the teachings herein. For example, the order of fields may vary, more fields or less fields than shown may be specified in a format, blank fields and blank spaces may be varied, so long as the format is clear from the start so that parties worldwide can appropriately program end ECDs, intermediate ECDs and central system devices consistent with whatever the format is.

SFIOIs may be strictly formatted for any particular central system, but may vary for different central systems. A logical packet size for a SFIOI may be 512 bytes, or 256 or even 128 bytes since a minimum page size in flash memory is also 512 bytes. Fields in a SFIOI may allocate full 64-bit words (or more, or less) for unique IDs for parties and unique IDs for VNs specified in the SFIOIs, and the number of VNs that may be specified in any SFIOI may be limited to, for example, 7 or 9. SFIOI formats may also require information of the actual number of VNs specified in the SFIOIs, a type (e.g. purpose) of the SFIOI, and so on. When data provided in different fields for a format for an SFIOI can be specified in fewer than 64 bits, the format for a SFIOI may specify that the data is to begin at the first bit of the field or is to end at the last bit of the field, so that either the end of the field or the beginning of the field has remaining bits set as zero (0). Fields in a SFIOI may also be provided for unique IDs of currency reader programs (CRPs) and electronic wallet programs (EWPs) that generate the SFIOIs and/or that handle the VNs. Approved CRPs and EWPs may operate in accordance with the expected format(s) for SFIOIs, so that they do not send SFIOIs that do not comply with the expected format(s).

The format shown in FIG. 1C may be used independently of most aspects of different types of potential VNs which are possible. So long as VNs are provided with unique IDs, a SFIOI format as in FIG. 1C may be used to track the VNs. Thus, VNs may be full data sets with image data, partial data sets with logical data that is supplemented with default templates when visualization of the VNs is requested, encrypted data sets such as cryptocurrencies, or any other types of data sets, so long as the VNs are provided with unique IDs that can be used for tracking purposes. Users may be enabled to visualize VNs using default templates stored on ECDs such as smart phones, such that VNs may be visualized by simply populating default templates with the variable information corresponding to any particular VN.

In the example format for a party identification in FIG. 1D, neither the number or the nature of the fields in the format in FIG. 1D are strictly required, and the number and nature of fields in a format for a party identification may vary from what is shown in FIG. 1D. In FIG. 1D, four fields are shown for a party identification. The party identification will be recognizable and interpretable by the central system 150. The first field is for a nation. Since between 128 and 256 nations or regions exist on Earth, a full byte of eight bits may be used to specify which nation the party corresponding to the party ID has registered with. Central tracking systems for different nations or groups of nations may communicate with each other, such as to confirm party IDs. Three digit identifications may be assigned to each nation and group of nations, so that party IDs may be uniformly formatted for multiple nations. The number of bytes for the first field or any other field in a party identification is not limited to that shown. The second field is for a state/region. For example, a party ID for a United States citizen or resident may be an identification issued by one of the fifty states, the District of Columbia, or five major territories in the United States. Six bits may be used to specify the state/region field for the United States citizen or resident. However, because other nations may have more than 64 or even more than 128 states or regions, a full byte of eight bits may also be used for the state/region field. The third field is for an ID type which may specify a type of party ID. For example, types of party IDs may include bank account numbers, national identification numbers such as social security numbers, social media account identification numbers, application identifications assigned to instances of CRPs or EWPs, and other types of party IDs. Depending on the potential number of types of party IDs that can be issued, either three bits, four bits, or five bits should be enough to identify all of the types of party IDs that are recognizable by a central tracking system. However, a full byte of eight bits may also be used for the type field in FIG. 1D. The fourth field is for an ID number. In an example, the third field and the fourth field in FIG. 1D may be combined and provided in five bytes of forty bits, where the first six bits of a first byte specify the ID type for the third field, and the last two bits of the first byte are the first two bits of the ID number in the fourth field. In some embodiments, party identifications may be obtained through banks or similar entities. For example, the first 13 bits of a party identification may be an identification for a bank or similar entity through which the party identification was obtained. One benefit of implementing party identifications this way is that a profile managed by the central system 150 may limit information of parties, since the banks and similar entities have records specifically identifying their customers, and the identification of the parties may be retained by the banks or similar entities without requiring a complete profile to be managed by the central system 150. Unbanked individuals may obtain unique IDs for using VNs via local branches of national postal services, such as via digital fingerprint pads which can be used by any individual with a finger to uniquely identify themself. A central system may be configured to accept only a universal ID as a party ID, or may be configured to accept and process multiple types of party IDs.

When a central system receives multiple types of party IDs, the central system may translate the multiple types into a universal ID type for consistent processing, or may process each of the different types as-is so long as they are accepted. Translation of variable (non-universal) party IDs is not required in all embodiments, and should be considered a discretionary process. Translation may involve retrieving a universal ID from a lookup table in a database. The central system 150 may store different alternative IDs in different databases, such as for telephone numbers and CRP identifications. As an alternative to lookup tables that store alternatives to universal IDs, a universal ID numbering system may be designed so that alternative IDs may be accepted from approved sources such as large social network providers and communication service providers. For example, if an 11 digit universal ID is used for a population up to 99.9 billion people, a 12th digit at the end may be used to specify whether an instruction or inquiry is coming from a specific account at or from the large social network providers or communication service providers. As an example, user 99999999999 (11 digits) may use 9999999991 (12 digits) to specify instructions that come from the user's Facebook messaging account, 999999999992 (12 digits) to specify instructions that come from the user's Gmail account, 999999999993 (12 digits) to specify instructions that come from the user's Verizon messaging account, and so on. If a 10 digit universal ID is used for a population up to 9.99 billion people, an 11th digit and 12th digit at the end may be used to specify up to 99 different accounts or other characteristics for an inquiry or instruction being sent to a central tracking system.

FIG. 2A, FIG. 2B, FIG. 2C, FIG. 2D, FIG. 2E and FIG. 2F illustrate layouts of different VNs. For example, governments and/or central banks may define a file type for VNs which is recognizable and readable by a new class of CRP(s) or EWP(s) installable on ECDs. The files for VNs may be stored in memories using logical filenames that end in a particular file extension such as ".cur". The CRPs or EWPs may be executed by processors to read VNs as files recognizable from the logical filenames and/or addresses that end in the particular file extension such as ".cur". A file for a VN may be primarily or entirely read-only, when read by an authorized CRP or EWP. A VN may include a defined data set with a plurality of fields that do not vary (i.e., are read-only) once created, even if one or more other fields of the defined data set (e.g., a metadata field) include content that may vary (i.e., are rewritable) after creation.

In the layout of a VN illustrated in FIG. 2A, the VN includes a set number of fields of predetermined types of information, is of a fixed size and layout that will be expected by CRPs and/or EWPs, and may have one or more fields each of a fixed size and readable in a predetermined order when processed by a processor executing the appropriate CRP or EWP. A CRP or EWP may execute and/or interpret the fields of the VN 201 so as, for example, to generate a display based on the VN 201, or to separate the fields of the VN 201 for separate processing or interpretation. The four fields in FIG. 2A include a value field, a unique ID field, a source indication field, and a notification instruction field. Each field may include expressions of data that can be represented as alphabetical, numerical, alphanumerical and/or symbolic text. The value field may provide a denomination for the VN 201, such as $100. The unique ID field may provide a unique ID for the VN 201. The source identification field may provide an identification of the source of the VN 201, such as United States Federal Reserve Bank of Boston, or European Central Bank. The notification instruction field may provide instructions for notifications to be made such as when the VN 201 is transacted, such as to automatically initiate a notification to the central system 150 when the VN 201 is transacted. In FIG. 2A, the VN 201 is not yet encrypted. However, one or more fields of the VN 201 may be subject to one instance of encryption, or alternatively may have different fields subject to different instances of encryption, so that only one set of one or more field(s) of the VNs is decryptable by one or more computers involved in transactions and another set of one or more other field(s) of the VNs is decryptable only by the central system 150. In one embodiment, one or more of the fields in the VN 201 may be encrypted via a first key, and one or more other fields in the VN 201 may be encrypted via a second key. For example, encryption of one or more fields of the VN 201 via the first key may be by a first computer system, and encryption of one or more other fields of the VN 201 may be by a second computer system (e.g., of the central system 150). In another embodiment, one or more of the fields in the VN 201 may be encrypted via a first key first and then via a second key second.

VN_info sent as a SFIOI may include an encrypted version of the unique ID of the VN 201, and the VN 201 may include an unencrypted version of the unique ID. The encrypted unique ID may only be decryptable by the central system 150 to confirm that the VN is owned by the transaction requester in each transaction, and this enable confirmation that the VN is owned by the transaction requester without providing the underlying unique ID to the counterparty.

In the layout of the VN illustrated in FIG. 2B, one or more field(s) of a VN may be encrypted and other fields of the VN are not encrypted. The field for the unique ID is encrypted, such as when the unique ID is encrypted and then the encrypted unique ID is arranged in the layout of the VN 201. The encryption of the unique ID may be decryptable at the central system 150 and/or at downstream ECDs that receive the VN 201. The VN_info may include the encrypted unique ID.

In the layout of a VN illustrated in FIG. 2C multiple fields of a VN are encrypted together and other fields of the VN are not encrypted. The fields for the value and for the unique ID are encrypted, such as when the encrypted value and the encrypted unique ID are to be arranged in the layout of the VN 201. The encryption of the value and the unique ID may be decryptable at ECDs that receive the VN 201. The fields may be encrypted together by a single key or separately by separate keys.

In the layout of a VN illustrated in FIG. 2D, all fields of a VN are encrypted together. The fields for the value, the unique ID, the source identification, and the notification instructions are encrypted, such as when, for example, the value, the unique ID, the source identification, and the notification instructions may be encrypted and then the encrypted value, the encrypted unique ID, the encrypted source identification, and the encrypted notification instructions may be arranged in the layout of the VN 201. The encrypted value, the encrypted unique ID, the encrypted source identification, and the encrypted notification instructions may be decryptable at ECDs that receive the VN 201.

Figure 2E:
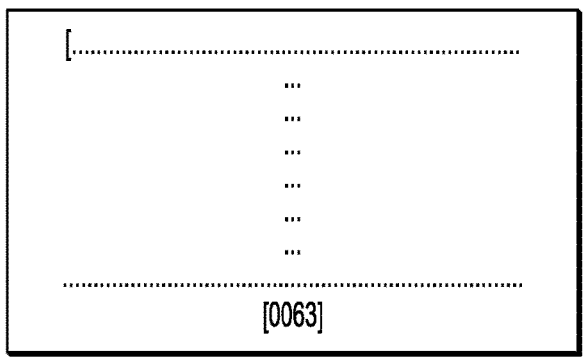
FIG. 2E and FIG. 2F illustrate different sets of VNs.
Figure 2E:
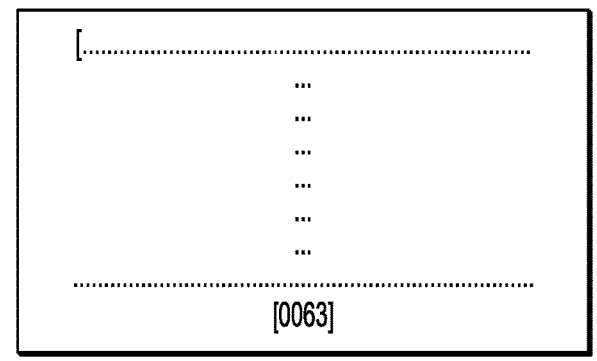

In the set of VNs illustrated in FIG. 2E, VNs have fixed sizes and one or more common characteristics that will be expected and recognized by CRPs and/or EWPs. The set of VNs include a first VN 203A and a second VN 203B which may be of identical sizes, such as by having the same number of bytes, the same number of fields, and starting addresses and ending addresses for each field in the same relative locations. The first VN 203A and the second VN 203B may have different content such as different unique IDs and/or other types of information such as creation dates and times and locations. For example, the first VN 203A and the second VN 203B may have fields in fixed and predetermined size, and one or more of the field(s) may be designed with more space than is expected to be needed for variable content that will populate the field(s). Field(s) of each of the first VN 203A and the second VN 203B may begin and end at the same relative location, and more space may be taken up by content in the field(s) in one of the first VN 203A and the second VN 203B than in the other. The design with more space than is expected to be used may be true for multiple or even all fields in VNs described herein. The first VN 203A and the second VN 203B are shown to each include sixty-four (64) bytes, though VNs may include fewer or many more than sixty-four bytes.

An ECD configured to use the VNs in FIG. 2E may be programmed to detect fields in the VNs at predetermined locations in the VNs. For example, an ECD may identify unique IDs for VNs by checking unique ID fields starting at a predetermined starting address, such as the four hundred and fortieth byte. The ECD may check one or more fields to confirm that the VN received by the ECD is valid and meets expectations. Additionally, a method of completing a transaction using the VNs in FIG. 2E may include finding a starting location for a field at a predetermined location in a VN, retrieving information such as a unique ID from the field, and confirming validity of the VN using the information retrieved from the field starting at the starting location.

Figure 2F:
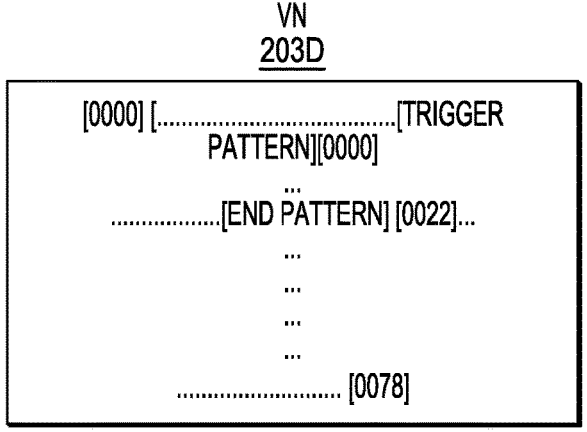
Figure 2F:
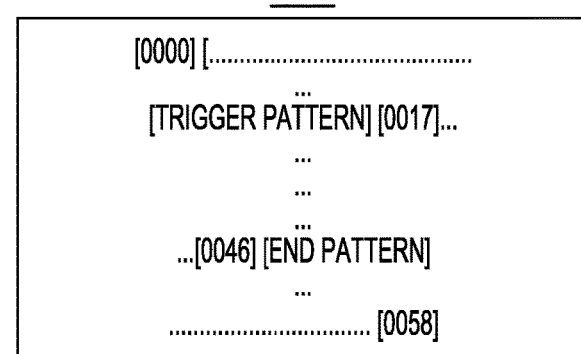

In the set of VNs illustrated in FIG. 2F, VNs may have variable sizes but use predetermined trigger patterns to identify the start and/or end of fields. The set of VNs include a first VN 203C and a second VN 203D which may be of substantially different sizes, such as by having different numbers of bytes, different number of fields, and/or different starting addresses and ending addresses for one or more fields. The first VN 203C and the second VN 203D may have different content such as different unique IDs and/or other types of information such as creation dates and times and locations. One or more fields may start with a trigger pattern, so that recipients may analyze the data of the VNs to recognize where a field starts. One or more fields may also end with an end pattern so that recipients may analyze the data of the VN to recognize where a field ends. For example, a field for a unique ID may start with a trigger pattern. The trigger patterns for the first VN 203C and the second VN 203D may be the same, or may comply with a standard that allows for variations for trigger patterns.

An ECD configured to use the VNs in FIG. 2F may be programmed to detect fields in the VNs at locations in the VNs identified by a trigger pattern. For example, an ECD may identify unique IDs in the VNs by first searching for starting trigger patterns for the unique ID fields, then extracting the unique IDs starting after the starting address identified from the starting trigger patterns. The ECD may check one or more fields to confirm that the VN received by the ECD is valid and meets expectations. Additionally, a method of completing a transaction using the VNs in FIG. 2F may include identifying a starting trigger pattern for a field, identifying a starting location for the field at a location in a VN starting at the starting trigger pattern, retrieving information from the field, and confirming validity of the VN using the information retrieved from the field starting after the trigger pattern. As an example, a starting trigger pattern may be two bytes, and the corresponding field may start immediately after the starting trigger pattern. Additionally, a starting trigger pattern may include characters such as 00000010 in a specific bit pattern of eight (or another number) of bits or Q5ZZS9D3 in a specific character pattern of eight (or another number) of characters.

A VN may be taken offline by an owner and the owner may notify the central system 150 via a SFIOI that a VN is being taken offline, such as by being stored on a portable memory such as a memory stick that will be left in a safe or a safe deposit box at a bank. The central system 150 may implement special arrangements for such circumstances since it is possible that the portable memory will subsequently be connected to an ECN (electronic communication network) at an entirely different location than where it was taken offline. In some embodiments, the central system 150 may request that the owner send the VN to the central system 150 to show possession (e.g., to a different IP address than used for SFIOIs), and upon verification of the VN at the central system 150, the owner may be allowed to transfer ownership to another party. If a VN is lost, such as when a portable memory is lost, an owner may be provided an ability to present ownership credentials to the central system 150. The central system 150 may cancel the VN and any other VNs registered with the owner, and simply issue new VNs to the owner with the same denomination.

Metadata for a VN may be included in a metadata field. A metadata field of a VN may also include updateable fields for the most recent owner of the VN and the current owner of the VN, and the updateable fields may be updated each time the VN changes hands. Some or all portions of a metadata field of a VN may be made writable even if most or all of the remainder of the VN is made read-only. As an example, writable portions of a VN may include a date/time of a last transfer of the VN, one or more unique identifiers and/or unique communication addresses for the most recent owner of the VN before the current owner, and potentially similar data that is to be updated for local use and processing as the VN is transferred between owners.

Sizes of digital images tend to be large, and this is due somewhat to the need to specify pixel values for each pixel in an image. Pixel values may each require one byte or two bytes when the range of pixel values is large. One byte includes eight bits, and eight bits will allow for two hundred fifty six different pixel values, whereas sixteen bits in two bytes will allow for sixty five thousand five hundred thirty six different pixel values. For an image with a density of three hundred pixels per inch in each direction, a square inch of the image will require ninety thousand pixels, and a two-byte range of pixel values will require one hundred eighty thousand bytes of data. An image with an area of five inches by three inches at this resolution requires two million seven hundred thousand bytes of data. A variety of mechanisms may be employed to reduce the bandwidth and storage requirements for VNs relative to these requirements.

Figure 2G:
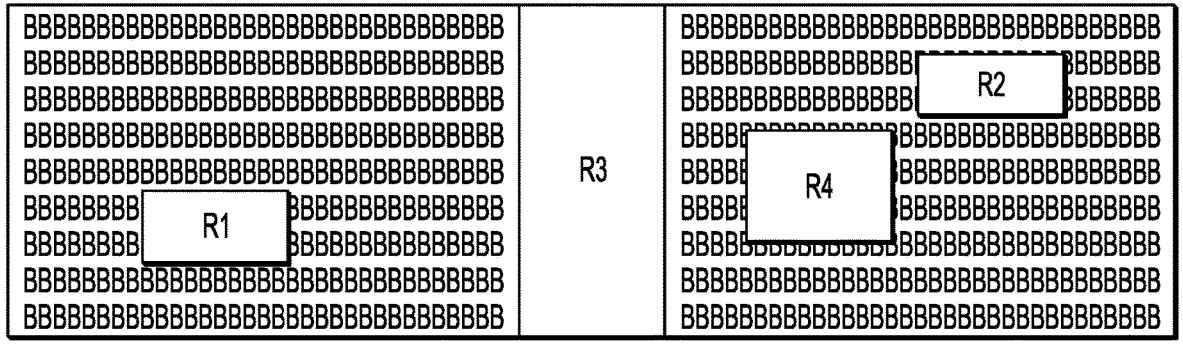
FIG. 2G, FIG. 2H, and FIG. 2I illustrate different layouts of VNs.

In the layout of a VN illustrated in FIG. 2G, the VN 205 is shown to have a length of fifteen hundred pixels in the X direction and a height of nine hundred pixels in the Y direction. For example, the VN 205 may be five inches by three inches, with a pixel saturation of three hundred pixels per inch. The same dimensions and pixel saturation are shown for FIG. 2H and FIG. 2I below, though visualizable VNs described herein are not limited to any particular dimension or pixel saturations. Dimensions may vary, for example, for different central banks, for different denominations, and/or in accordance with agreed upon standards. A first mechanism used for FIG. 2G includes the use of a default template for a VN 205. The only data that is required from the central system 150 to display the VN 206 is data for four reserved fields labelled as R1, R2, R3 and R4. The four reserved fields may include space for a unique ID of the VN 205, a date and/or time of creation of the VN 205, a source (e.g., an issuer or sponsor) of the VN 205, and other variable information that may vary for different VNs. The reserved space may be as relatively small as 20% or less of the total visualizable space for a VN. Accordingly, even if a relatively large amount of space is required to store voluminous bytes for a template for VNs such as for templates of each of several denominations, the amount of bandwidth required to communicate the data for the reserved fields may be significantly reduced. Additionally, while VNs may be made visualizable using such templates, VNs do not need to be visualized for use. In FIG. 2G, the pixel values are each represented by "B" for one byte. However, the potential range of pixel values may be even larger, such as two bytes. The entire space of the VN 205 in FIG. 2G is filled up with pixels, each requiring one byte of pixel information, and this includes the data for pixel values for the four reserved fields.

Figure 2H:
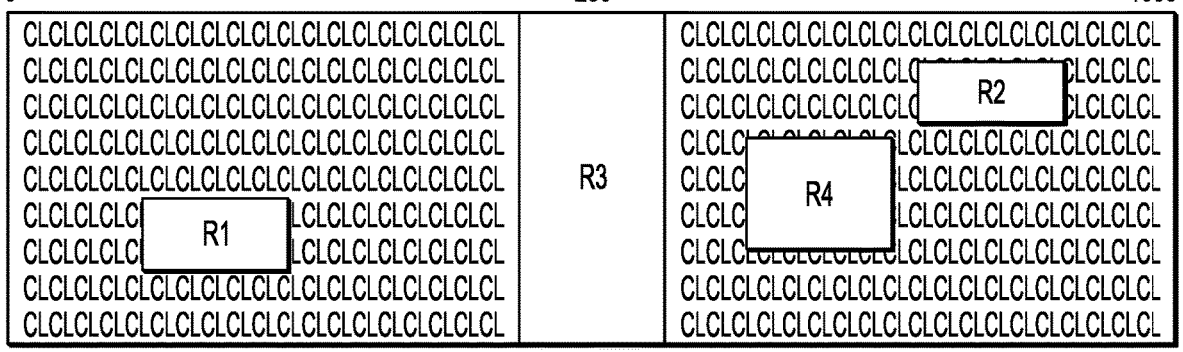

In the layout of a VN in FIG. 2H, the range of pixel values for the VN is limited to five. The prevalent value is assumed as a default that does not need to be specified for any pixel, and the other four colors in the range may be represented by only two bits instead of eight (for one byte) or sixteen (for two bytes). Furthermore, a length may be specified since the same color may be used for multiple adjacent pixels. Lengths from one pixel to sixty four pixels may be specified in a single byte with a specified color by using six bits of the byte. The locations of pixels for each color may be listed sequentially by address and color, or may be grouped by color. In the case where locations of pixels are grouped by color, the data set of the VN may include a list of the colors, and the starting locations and segment lengths of pixels for each color by group. Additionally, locations for reserved areas may be left blank in a template and then filled in with the information sent as the VN as described herein. In alternative embodiments, a byte may include three bits to designate up to eight colors and five bits to designate lengths up to thirty two pixels. In other alternative embodiments, a byte may include four bits to designate up to sixteen colors and four bits to designate lengths up to sixteen pixels. In still additional alternatives, a byte may include five bits to designate up to thirty two colors and three bits to designate lengths up to eight pixels. The compression mechanisms of FIG. 2H reduce bandwidth, or storage and/or processing requirements, at least in terms of the image data. The use of a small range of pixel values that can be specified using 2 bits per pixel will still require three hundred thirty seven thousand five hundred bytes ((1500×900×2)/8) if each pixel value is individually specified, though most of this may be stored locally as a template on an ECD. Accordingly, bandwidth requirements for transmission of variable data to render any particular VN consistent with FIG. 2H may be on the order of one hundred thousand bytes.

The minimum number of bytes required to specify pixel values for a row in FIG. 2H is approximately twenty five if only one pixel value (color) is required for full sets of sixty four pixels in every instance. However, since this is unlikely for any particular set of sixty four pixels, let alone for all sets of sixty four pixels, all or almost all rows will require more than twenty five bytes. The configuration shown in FIG. 2H will require a minimum of more than twenty thousand bytes for all rows, though the actual requirement for this area and pixel concentration would likely be double, triple, quadruple or more than this data requirement. Most of the required data may be stored locally as a template on an ECD. Accordingly, using a template, bandwidth requirements for transmission of any particular VN consistent with FIG. 2H may be on the order of twenty thousand bytes. Essentially, this would impose almost no significant burden on a modern ECD that is capable of rendering digital images for a VN. In some alternative embodiments, locations of pixels may be listed for each of a limited number of colors. For example, for color 1, locations may be listed as [s11] to [e11], [s12] to [e12] and so on where s stands for "start" and e stands for "end". For color 2, locations may be listed as [s21] to [e21], [s22] to [e22], and so on.

Figure 2I:
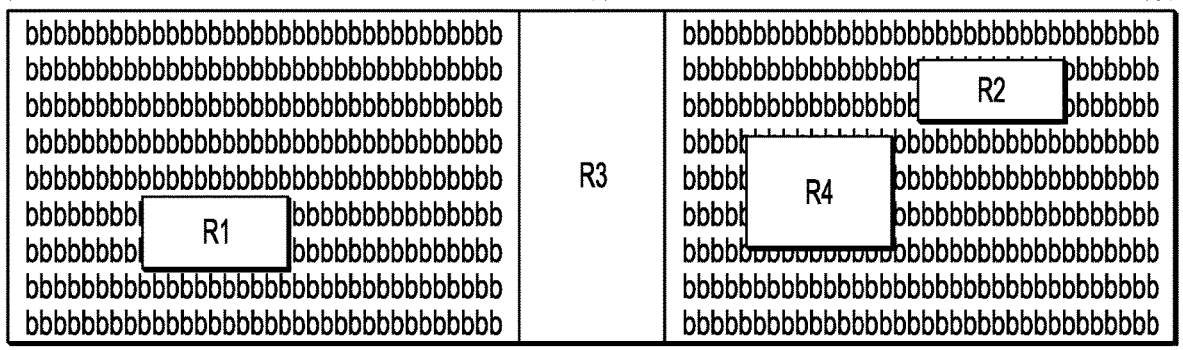

In the layout of a VN in FIG. 2I, each pixel value is specified by two bits and there is no default color. Accordingly, one byte of data may include pixel values for four consecutive pixels. For the VN 205 with a length of five inches and a pixel concentration of three hundred pixels per inch, the full image data of a row may be specified by three hundred seventy five bytes instead of fifteen hundred bytes (for one byte per pixel) or three thousand bytes (for two bytes per pixel). This will still require three hundred thirty seven thousand five hundred bytes, though most of this may be stored locally as a template on an ECD. Accordingly, using a template, bandwidth requirements for any particular VN consistent with FIG. 2I may be on the order of one hundred thousand bytes. In FIG. 2I, the locations of pixels for each color may be listed sequentially by address and color, or may be grouped by color. In the case where locations of pixels are grouped by color, the data set of the VN may include a list of the colors, and the locations of pixels for each color by group. Additionally, locations for reserved areas may be left blank in a template and then filled in with the information sent as the VN as described herein.

For embodiments consistent with any of FIG. 2G, FIG. 2H and/or FIG. 2I, any reserved field may not require pixel data to be sent in order to be filled. Rather, logical data such as a unique ID may be sent as part of a VN described herein, and then used to populate the reserved field with pixel values for characters of the unique ID. For example, an ECD may store ten sets of templated pixel values for digits of 0 through 9, twenty six sets of templated pixel values for letters from A through Z, and/or other pixel values for other characters. Each template for a character may be of the same size, and the rendered characters may be centered in the space pixelized using the pixel values. Accordingly, relative locations of the pixels may be added to the template so that the templates are used to populate each character in the reserved field. Use of logical data and templated characters with a consistent format may substantially reduce bandwidth requirements for transmission of VNs even more than simply using templates and sending pixel values for pixels in the reserved fields.

In one alternative to embodiments based on FIG. 2I, color values for pixels may be limited to black and white. Accordingly, the number of bytes for a VN that can be shown in black and white may be reduced by up to fifty percent compared to a VN that is shown by four colors. That is, rendering a VN in only black and white, or in only any two colors, requires the use of only 1 bit to designate each color as either a 0 or a 1. This allows for much less data processing and storage compared to even a VN rendered in three or four colors since three or four colors will require two bits to specify for each pixel. Therefore, a combination of two colors may specify colors for eight individual pixels in one byte, and this potentially minimizes the data requirements for a VN rendered in three hundred pixels per inch, even with no other data compression. Other combinations may be used to trade-off color ranges for maximum address ranges. For example, four colors can be specified in two bits, eight colors can be specified in three bits, sixteen colors can be specified in four bits, thirty two colors can be specified in five bits, and sixty four colors can be specified in six bits. Any of these color ranges may be appropriate in different embodiments. In some alternative embodiments, locations of pixels are listed for each of a limited number of colors. For example, for color 1, locations may be listed as [s11] to [e11], [s12] to [e12], and so on. For color 2, locations may be listed as [s21] to [e21], [s22] to [e22], and so on.

In embodiments above, compression is explained in the context of limited use of colors, which reduces the possibilities of any pixel having any color among the full spectrum of colors. However, other forms of compression may also be used to communicate, store and process data for VNs. For example, in an RGB scheme, each pixel is provided with a value only for one of red (R), green (G) or blue (B), and the two missing values are filled in by interpolation. The trade-off here may be a lower amount of data that is communicated and stored, but potentially increased processing requirements in order to render an image based on the RGB data. Nevertheless, if more than four or five or eight colors are used to render VNs, alternative color specifications such as the RGB scheme may be used consistent with the teachings herein.

Different templates may be provided for each different denomination of a digital currency, and users may store the templates for VNs they expect to use most frequently. In some embodiments, some or all variable information may be provided as black and white color values for pixels, whereas some or all pixel values for the template are provided as color values for pixels. Alternatively, some or all of the variable information may be provided as color values for pixels, whereas some or all of the template is provided as black and white color values for pixels.

In some embodiments, one or more of the fields for a VN, including one or more of the reserved fields, may be provided as three-dimensional (3D) image data, i.e., as voxel data. For example, an image to display in the center of a VN of a particular denomination may be a three dimensional representation of a heroic figure in the history of the nation or regions for which the digital currency is issued. Additionally, images specific to denominations of VNs may vary such as by month or year, so that different heroic figures are represented by three-dimensional images when a VN is rendered on a screen using an approved CRP or EWP. In some embodiments, the three-dimensional (3D) image data may be used only for some, but not all, denominations, such as for a $10,000 VN or a $1,000000 VN. The three-dimensional image data may require virtual reality readers to appreciate.

In some embodiments, a renderable VN is not required to have a visualizable rectangular shape. A VN may include a first reserved field R1 and a second reserved field R2 which are reserved for variable data. For example, R1 may be reserved for the variable data of a unique ID of the VN, and R2 may be reserved for variable data of an issuer and an issue date for the VN. A rectangular shape may be used as a background coordinate system that is used by an image processor to determine where to render each pixel of the VN. A VN template may be used to render the entirety of the VN except for the data to be populated in R1 and R2. For example, the renderable shape of a VN may be a circle, a triangle, a shape of the letter "Z", or even multiple separate (non-adjacent) portions relative to the background coordinate system.

The data set of a VN may be provided as a single file or a folder of multiple files. Fields included in the dataset of a VN may include image data if VNs are provided partially or fully as images passed between parties. However, since templates may be used to populate most of the data of an image if and when a VN is to be rendered, the VN that is passed between parties may include much less data than a full renderable image, and may include minimal data such as the field for the specific unique ID of the VN, or combinations of the field for the specific unique ID and a field for specific denomination, or all 3 of the field for the specific unique ID of the VN, the field for the specific denomination and the field for the indication of the source of the VN. A VN may also be provided as a folder with multiple files including, for example, a file for the ownership history of the VN and/or another file used to render the VN as a visualization if and when requested. Groups of VNs may include differentiations based on when or where they were generated, such as on different days, different months, different years or in different places. A background image for VNs may vary between sets, analogous to how different sets of stamps are issued, even in embodiments where the background image is provided as a template rather than data passed between parties. In this way, a verification for checking validity of any particular VN may include simply comparing the background image in the VN with the date of creation of the VN to ensure the background image is the correct background image used for VNs at the time the VN was created.

In some embodiments, superimposing may be performed by arranging the VN as it would be visualized if rendered on a display without the unique ID, and then replacing some of the bits representing pixels of the VN with bits representing pixels that will show (when read) the unique ID on the VN when rendered on a display. The superimposing may be provided even when a template is used for most or all of the image to minimize data passed between parties. In another embodiment, superimposing may be provided by placing or adding a unique ID as a supplement to the data fields of a VN, such as in an addendum before or after all other data fields of a VN. As an example, a VN may be fully or partially encoded in an image format so that 1 or more fields of the VN may be displayed. For example, a file in a VN application may be fully or partially encoded and/or compiled in an image format.

A VN may be provided as a file attached to or included in the body of an email or message. Files comprising VNs may be transferred via other mechanisms including file transfer protocol (FTP), hypertext transfer protocol (HTTP), file transfer protocol over SSL (FTPS), hypertext transfer protocol over SSL (HTTPS), SSH file transfer protocol (SFTP), applicability statement 2 (AS2), odette file transfer protocol (OFPT) or accelerated file transfer protocol (AFTP).

Requesting parties may be independently notified of transfers. To combat spoofing, the central system 150 may automatically notify the current owner of a VN when a transfer instruction to transfer a VN is received, and the notification may be sent to a communication address of record at the central system 150 for the current owner. Anti-spoofing checks may be performed using push notifications as a form of multi-factor authentication, such as by dynamically generating and sending one or more random characters as part of a confirmation message to a phone number listed for the first party, and waiting to receive the 2 characters back from the phone number as confirmation that the transfer is authorized. When an ECD initiates a transaction or a transfer notification, the ECD is expected to be on and in the hands of the user. In some embodiments, a service may be used to implement multi-factor authentication for multiple applications and programs on ECDs, so that push notifications for the same service may be used to confirm VN transfers, transaction initiations, VPN log-ins, and/or other types of actions.

In some embodiments, an executable program may be embedded within a VN and configured to initiate SFIOIs with the central system 150 periodically and/or when an internet connection is available after being unavailable, so as to initiate a report of the current location of the VN as a check-in process not initiated by a party. The executable program may simply initiate a report of the current location of the VN. Metadata may be sent to the central system 150 as a SFIOI to update the electronic records at the central system 150 and eliminate some or all of the metadata in the VN. The metadata may include records of offline transactions involving the VN, such as transactions using near field communications (NFC). When the reported metadata is from a metadata field of the VN, the program may report the metadata and then delete the metadata. For example, an executable software subroutine of instructions may be retrieved from a VN whenever metadata is extracted. Executable software subroutines may be included in a specific field of a VN, such as in a metadata field or a separate instruction field, and may be provided in duplicated forms in multiple software languages so that the VN can be processed by different computers using different types of operating systems. When the executable software subroutine is retrieved and processed, the executable software routine may recognize that the VN is being moved or has moved, and the executable software subroutine may initiate generation of a SFIOI to report the movement to the central system 150.

Figure 3A:
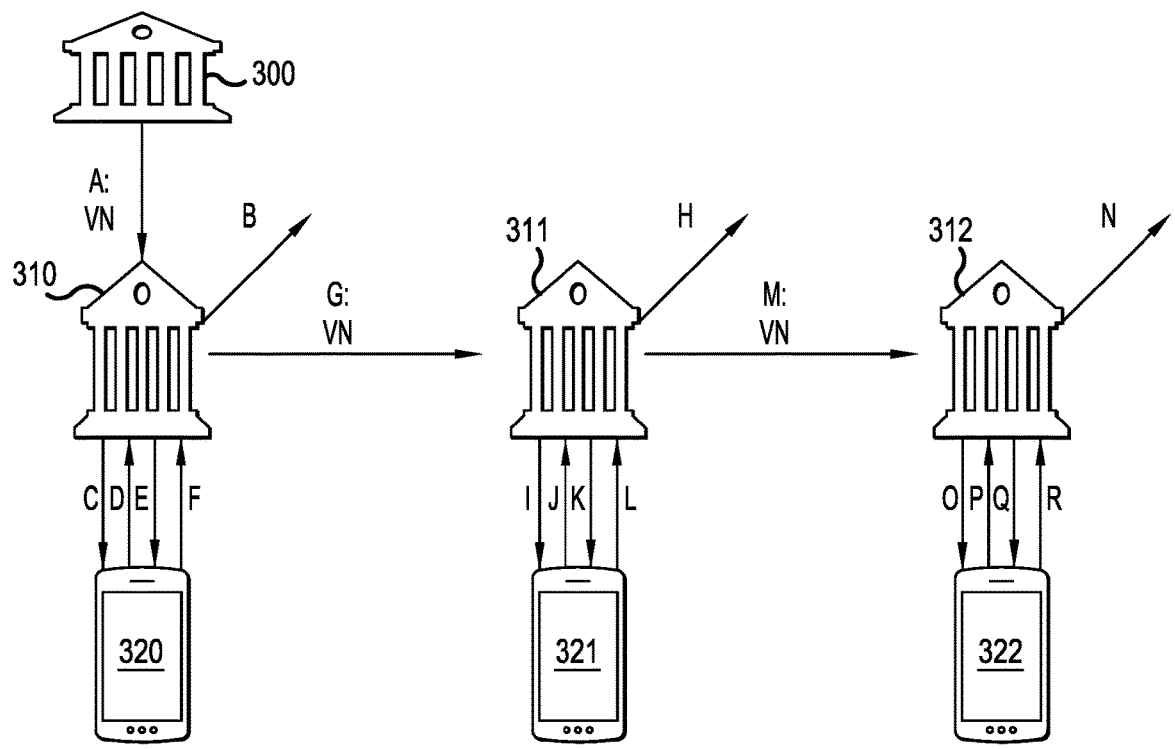

In the communication flow for custodial handling for a VN in FIG. 3A, a VN may be held in the custody of a service provider on behalf of an end user and provided to the end user on-demand. For example, VNs may be held by memory systems controlled by financial institutions, even though individual VNs may be specifically held in the name of account holders so that the individual VNs can be downloaded to ECDs of the account holders upon request.

In FIG. 3A, the VN is created by or on behalf of an institution 300. The institution 300 provides the VN to a first service provider 310 at step A. The first service provider 310 provides a SFIOI including the VN_info and the 320_info to a tracking system such as the central system 150 at step B. The first service provider 310 provides the VN_info to a first user account 320 at step C, and the first user account 320 acknowledges the VN_info at step D. At step E, the first user account 320 receives the VN, such as upon request, and at step F the first user account 320 returns the VN to the first service provider 310 such as when the VN is being used as a payment arranged through the first service provider 310. Accordingly, the first service provider 310 holds the VN for the first user account 320 until the first user account 320 requests to receive the VN. Additionally, the notification at step B may be provided before step C, simultaneous with step C, or after step C, as long as the notification at step B is made once the transfer of ownership to the first user account 320 is confirmed. Steps G through L and M through R mirror steps A through F for the first service provider 310, the second service provider 311 and the third service provider 312 and the first user account 320, the second user account 321 and the third user account 322. Reporting to a tracking system such as the central system 150 may reflect that the VN is owned by the parties corresponding to the user accounts even when the VN is held by the service providers. The first service provider 310, the second service provider 311 and/or the third service provider 312 may provide electronic financial accounts to parties as a service. Examples of such accounts include savings accounts, checking accounts, credit accounts such as a credit account or mortgage account or retail account, a utility account, or another form of electronic financial account used to record and track amounts saved by, earned by, or owed by account holders to users as a service. The first user account 320, the second user account 321 and the third user account 322 are representative of electronic financial accounts provided by the first service provider 310, the second service provider 311 and/or the third service provider 312. The first user account 320, the second user account 321 and the third user account 322 can be accessed via 1 or more ECDs such as smartphones, tablets, laptop computers and desktop computers. Functionality attributed herein to user accounts such as the first user account 320 may be performed by ECDs.

Figure 3B:
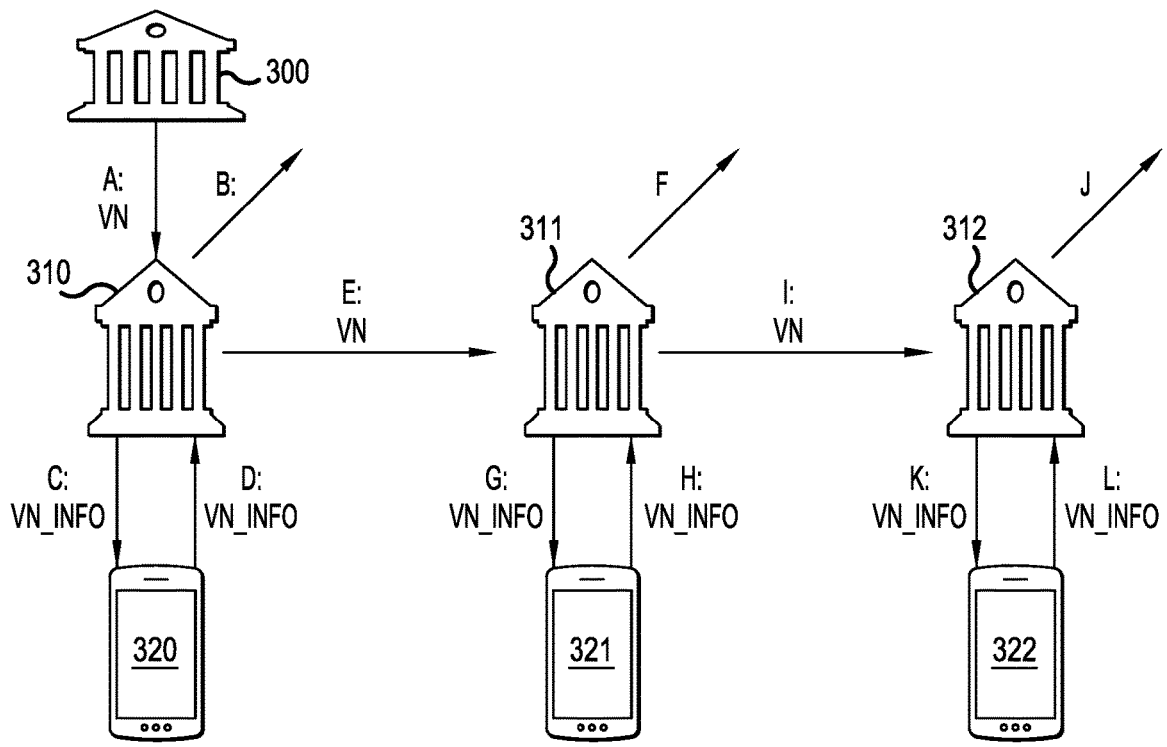

In the communication flow for custodial handling for a VN in FIG. 3B, a VN may be physically and legally held in the custody of a service provider in the name of a party without ever being physically provided to the party before being transferred away. In FIG. 3B, the VN is transferred at step A, step E and step I only between the institution 300, the first service provider 310, the second service provider 311 and the third service provider 312. However, the VN is held in the name of the first user account 320, the second user account 321 and the third user account 322. The notification to the tracking system such as the central system 150 at step B, step F and step J may report ownership of the VN being transferred to the first user account 320, to the second user account 321 and to the third user account 322, even though the VN is held in custody of the first service provider 310, the second service provider 311 and the third service provider 312 in FIG. 3B.

In the communication flow for withdrawing a VN from an account in FIG. 3C, current automatic teller machine (ATM) functionality is replaced for digital currencies. In FIG. 3C, a first service provider 310 provides a custodial account for the ECD 323. For example, the ECD 323 receives the VN_info at step A, and the corresponding VN is held by the first service provider 310. When the party using the ECD 323 wishes to retrieve the VN, the party uses the ECD 323 to access the custodial account at step B and retrieve the VN at step C. In the embodiment of FIG. 3C, VNs may be retrieved from the first service provider 310, such as when the party using the ECD 323 has a checking account with the financial institution. The first service provider 310 may send VNs specifically held in the name of the party using the ECD 323, or may retrieve VNs or VN_info from a memory system of the first service provider 310 and transfer the VNs or VN_info to the ECD 323. The memory system that holds VNs or VN_info which are not specific to any account may be a general ledger storage system that also maintains or has access to records of account balances, so that when VNs are sent from the ledger storage system to an ECD, the ledger storage system may be updated to debit the withdrawn VNs from the appropriate account balances. In the example of FIG. 3C, the central system 150 may still be notified when the VNs are transferred to the party using the ECD 323 if they were not already in the name of the party.

In some embodiments, withdrawals of VNs may be modified in some circumstances by using special handling including intermediaries and specific types of communications such as near field communications (NFC). For example, if for any reason an ECD cannot directly access a service provider and an intermediary financial institution can, the ECD may send the request for the VN by sending the VN_info to the intermediary financial institution and the intermediary financial institution sending the VN_info and the ECD info to the service provider so that the service provider sends the VN to the intermediary financial institution to provide to the ECD. The embodiment of FIG. 3D may apply when a party travels to a region deemed unsafe, so that VNs may only be transferred to institutions deemed safe in the unsafe region. For example, the intermediary financial institution may be an intermediary computer system at a foreign bank, police station or other government office, embassy, or anywhere else deemed safe in a region where parties are not able to directly receive VNs via their own ECDs.

In some embodiments, an ECD may directly transfer a VN to another ECD, such as by a file transfer protocol, a message, or an email. In some embodiments, an ECD may send a routing number and an account number to another ECD which directly transfers a VN to a service provider that provides an account corresponding to the routing number and the account number. In some embodiments, an ECD sends a routing number and an account number to another ECD which provides the routing number and the account number to a service provider which directly transfers the VN to another service provider that provides an account corresponding to the routing number and the account number. In some embodiments, an ECD sends a communication address to another ECD which directly transfers a VN to yet another ECD corresponding to the communication address. In some embodiments, an ECD sends a proxy identification to another ECD which sends the proxy identification to a proxy system that directly sends a VN to yet another ECD using the proxy identification.

In the segregated and selectively shielded memory system for storing VNs in FIG. 3E, some types of storage for VNs may be disconnected from ECNs as a default, and only connected for limited amounts of time and based on specific protocols. A controller 357 is connected to an ECN 358. The controller 357 is also directly connected to a first switch 355 and indirectly connectable to a second switch 356 through the first switch. The first switch 355 is switchably connected to and disconnected from a first memory 351. The first memory 351 may be, for example, a relatively small memory that stores VNs that can be dynamically retrieved and sent to parties on demand. The first switch 355 may be left switchably disconnected from the first memory 351 as a default, and may be switchably connected to the first memory 351 when the controller 357 is writing VNs to the first memory 351 or retrieving VNs from the first memory 351. A second memory 352 is switchably connected to and disconnected from the second switch 356. The second memory 352 may store a larger volume of VNs than the first memory 351. The second switch 356 may be connected to the first switch 355 when the controller 357 instructs the first switch 355 to connect to the second switch 356. The controller 357 may retrieve VNs from the second memory 352, such as to replenish the VNs stored in the first memory 351. For example, the controller 357 may connect the first switch 355 to the second switch 356, and retrieve the VNs from the second memory 352. Afterwards, the controller 357 may disconnect the first switch 355 from the second switch 356, and store the retrieved VNs to the first memory 351 via the first switch 355. A third memory 353 is switchably connected to and disconnected from the second switch 356. The third memory 353 may be analogous to a bank vault, and may store the largest amount of VNs of the memories shown in FIG. 3E. The second switch 356 may be connected to the first switch 355 when the controller 357 instructs the first switch 355 to connect to the second switch 356. The controller 357 may retrieve VNs from the third memory 353, or may write VNs to the third memory 353. After retrieving VNs from the third memory 353 or storing VNs to the third memory 353, the controller 357 disconnects the second switch 356 from the third memory 353, and disconnects the first switch 355 from the second switch 356. Other switching configurations may be used to physically and logically disconnect and disconnect memories that store VNs without departing from the scope and spirit of the teachings herein. Many different contexts exist in which those responsible for storing VNs will want their VNs to be physically disconnected from any public ECNs as a default state. In FIG. 3E, a shield 354 is also provided around the third memory 353. The shield 354 may be an EMP shield that protects the third memory 353 from an electromagnetic pulse threat as a default state. For example, the third memory 353 may be stored in an underground vault for a bank, or at Fort Knox, Kentucky for the central systems described herein when a central system is implemented by or for the United States Federal Reserve. For example, the shield 354 may be or include a Faraday cage and/or an EMP shielded rack.

Figure 4A:
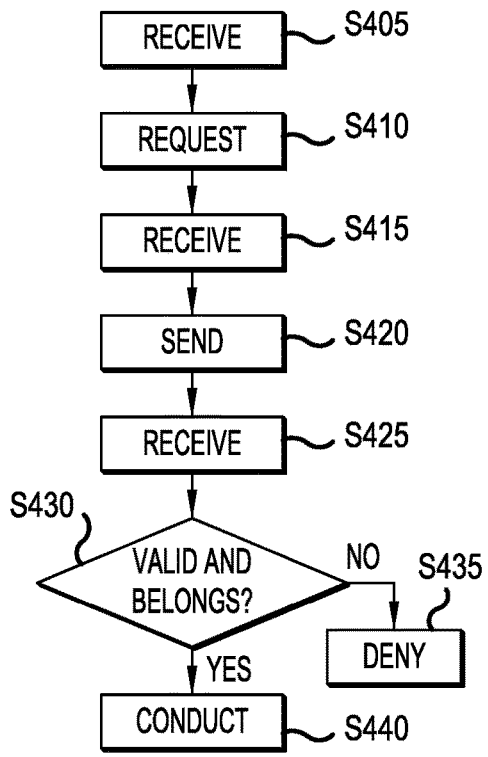
FIG. 4A illustrates a transaction method.

In the transaction method for digital currencies in FIG. 4A, a VN is processed for a transaction from the viewpoint of an ECD of a counterparty in a transaction. At S405, a request is received for a transaction paid for by a VN. At S410, a denomination, unique ID, and party identification of the transaction requesting party is requested. At S415, the denomination, the unique ID for the VN and the party identification of the transaction requesting party is received. At S420, the unique ID for the VN and the party identification of the transaction requesting party are sent to a verification service implemented by the central system 150. At S425, verification or no verification is received from the verification service. At S430, whether the VN is valid and belongs to the transaction requestion party is determined based on the verification or no verification received from the verification service at S425. If the VN is valid and belongs to the transaction requesting party (S430=Yes), at S435 the transaction is conducted. The transaction may be conducted by the transaction requesting party sending the VN to the counterparty, and the counterparty notifying the central system 150 of receipt of the VN. If the VN is not valid and/or the VN does not belong to the first party (S430=No), the transaction is denied at S440.

Figure 4B:
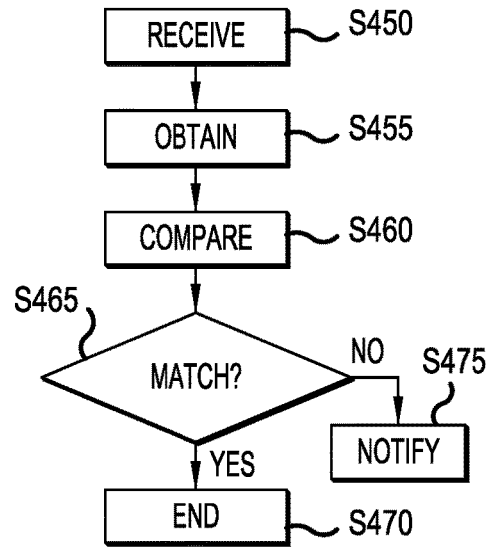
FIG. 4B illustrates an inspection method.

In the inspection method for digital currencies in FIG. 4B, a VN may be inspected for expected characteristics, either at an ECD or at a central system. A VN is received by an ECD at S450. The ECD may have a CRP and/or an EWP installed thereon, and may be configured to inspect a VN. At S455, the ECD obtains expected VN characteristics for the VN received at S450. For example, the ECD may retrieve expected VN characteristics including a size of the VN, starting location(s) of 1 or more field(s) such as the unique ID field for the VN, a number of fields in the VN, a background image for the VN, a date and/or time of creation for the VN, a location of creation for the VN, and/or any known characteristics of the VN that may be checked in an inspection. A tampering mark, such as a value that is changed in a VN at a predetermined location whenever an authorized CRP or EWP detects attempted tampering, may be checked at S455. The value may be reflected in 1 or more bits that are changed automatically when an authorized CRP or EWP detects that it is being used to tamper with a read-only VN or read-only portions of a VN, or otherwise modify a VN in an impermissible manner. Accordingly, even if a hacker prevents an ECD from communicating with the central system 150 while tampering with a VN, an authorized CRP or EWP may still subtly leave a mark in the VN indicating the tampering attempt for later detection. At S460, the expected VN characteristics are compared with the VN. Specifically, a CRP or EWP may check to ensure that data and fields are present, include expected content, start where expected, end where expected, are of an expected size, and/or otherwise meet any expectations set in the expected VN characteristics. At S465, whether the expected VN characteristics match the VN is determined. The determination at S465 may require an exact match, or may allow for discrepancies within predetermined ranges such as if a size of a VN may be reduced or lost if packets are dropped during transmission, so that a size expectation may allow for losses that would reflect dropping of 1, 2, 3 or any set number of packets deemed reasonable, or may be more granular and allow for a predetermined number of lost bytes of some types. The predetermined ranges may vary depending on the communication environment(s) in which the VN is communicated. On the other hand, some characteristics may require an exact match. For example, no variation may be allowed for the overall content of an expected background image, or for any indication of intentional tampering left by altered content of 1 or more bits at predetermined locations. At S470, if the expected VN characteristics match the VN, the process ends. At S475, if the expected VN characteristics do not match the VN, a tracking system such as the central system 150 may be notified. For example, following a transaction, a counterparty using an ECD may perform the inspection in FIG. 4B, and may notify the central system at S475. The method of FIG. 4B may be performed regularly for all VNs, selectively only when VNs are transferred to particular recipients such as banks, or selectively such as when a central system 150 is notified of a transaction involving a VN on a greylist and determines that a check for the validity of the VN is warranted.

Figure 4C:
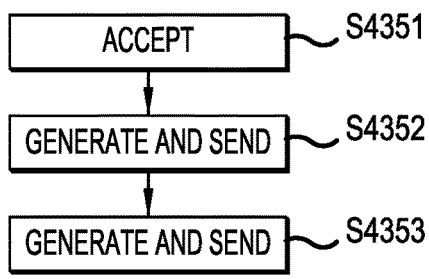
FIG. 4C and FIG. 4D illustrate different transaction methods.

In the method for a VN recipient to conduct a transaction in FIG. 4C, at S4351, the recipient of the VN accepts the VN and a change due amount, if any. The change due amount may be an amount to be debited from or credited to an account of the recipient and an account of the sender. As explained elsewhere herein, the change due amount, if any, may be handled to some degree by a central system, but this is not required, and the change due amount may also be agreed to between parties in a transaction. For example, if a party provides a VN over NFC at a gas station, a gas station attendant may simply provide physical change to the party so that the change due amount is not notified to a central system. At S4352, the recipient generates a receipt acknowledgement and sends the receipt acknowledgement to the first party (the sender). At S4353, the recipient generates a receipt notification including change due data and sends the receipt notification to the central system. The central system may handle the receipt notification including change due data by sending instructions to handle the debits and credits for change at the accounts specified for the recipient and the sender.

Figure 4D:
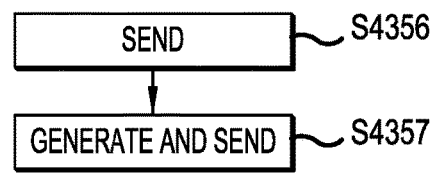

In the method for a VN sender to conduct a transaction in FIG. 4D, at S4356, the sender sends the VN and change due amount, if any to the recipient. At S4357, the sender generates and sends the transfer instruction, including change due data to the central system.

Figure 5A:
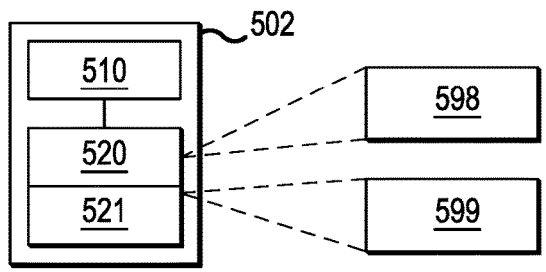
FIG. 5A illustrates an ECD.

In the ECD illustrated in FIG. 5A, the ECD is configured to receive VNs, to transfer VNs and to send SFIOIs. The ECD 502 includes a memory 520 that stores instructions and a processor that executes the instructions. The memory 520 also stores the CRP 598 and the EWP 599. A VN memory 521 is also included, and is representative of a dedicated memory for VNs downloaded to the ECD 502. The memory 520 and/or the VN memory 521 may also store unique ID information used to uniquely identify ownership of any VNs transferred to the ECD 502, or assigned to or transferred to institutional accounts on behalf of the owner of the ECD 502. The CRP 598 and/or the EWP 599 may be configured to place a tampering mark such as a value at a predetermined location in/on a VN when tampering is detected. Moreover, the CRP 598 and/or the EWP 599 may be configured to check to ensure that data and fields are present, include expected content, start where expected, end where expected, are of an expected size, and/or otherwise meet any expectations set in the expected VN characteristics. The CRP 598 and/or the EWP 599 may be configured to analyze new VNs received by the ECD 502 to confirm expected VN characteristics and instructions and report the results of the comparison to a central system. The unique ID of the EWP 599 and the unique ID of the CRP 598 may also be placed on greylists and blacklists when the EWP 599 and the CRP 598 are confirmed to be or suspected to be involved in misconduct, such as handling VNs reported lost or stolen. The EWP 599 and the CRP 598 may be disabled from handling VNs once placed on a blacklist or greylist.

The CRP 598 and the EWP 599 may be account applications provided on behalf of a service provider. The account applications may be used by the service providers and their users/account holders to manage finances. The EWP 599 may also automatically initiate verification requests such as to the central system 150 to verify ownership of VNs used in transactions. The EWP 599 may also be used to notify tracking systems such as the central system 150 when a VN is transferred from the ECD 502, and to confirm receipt of a VN when the VN is transferred to the ECD 502.

Transactions involving the EWP 599 may involve multiple VNs simultaneously. However, the number of VNs that can be verified by a tracking system simultaneously may be intentionally throttled for many reasons including to ensure that a party engaging in fraud can be caught and blacklisted quickly. The central system 150 or another tracking system may impose a limit of five, ten, thirteen or another number of VNs for verification at any 1 time.

Figure 5B:
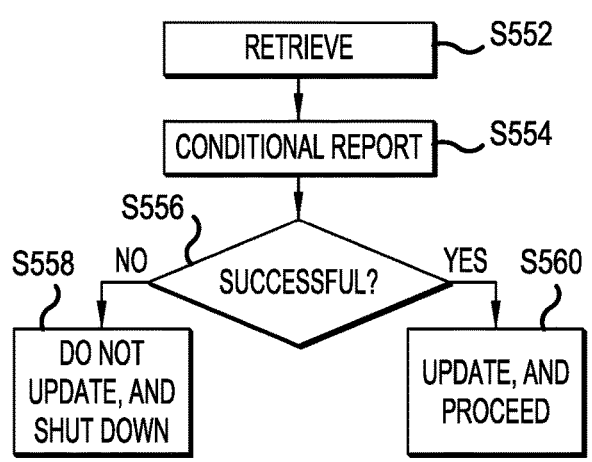
FIG. 5B illustrates a method of reading a VN.

In the method of reading a VN in FIG. 5B, periodic reporting to a tracking system for dormant VNs is shown. Authorized CRPs and/or EWPs may be prevented from operating if unable to communicate over ECNs. This functionality may be implemented to ensure that VNs are properly tracked by a central system 150, or to help ensure that lost or stolen VNs can be tracked immediately when read by an authorized program. At S552, a unique ID and a date of last read for a VN are retrieved. The unique ID and the date of last read may be included in metadata that is the first data read by an authorized CRP or EWP, though the unique ID may also be included in a unique ID field. The unique ID may be maintained in both unencrypted and encrypted forms in a metadata field, such as so that the encrypted unique ID can be proactively sent to counterparties. At S554, the CRP or EWP may read the date of last read, and if above a threshold, attempt to report to the central system 150. For example, the CRP or EWP may attempt to generate and send a SFIOI that includes the unique ID to a predetermined IP address for the central system 150. The SFIOI may include a short set of information including the unique ID for the VN, a unique ID for the CRP or EWP, and/or a unique communication address and/or device identification that uniquely identifies ECD attempting to read the VN. At S556, the CRP or EWP may determine whether the report was successful, such if a response is received from the central system 150 within a predetermined time period such as 5 or 10 seconds or if a port was used to send the notification. If the report was unsuccessful, at S558 the CRP or EWP does not update the date of the last read in the metadata of the VN and ends the read attempt. At S560, if the report was successful, the CRP or EWP proceeds with updating the date of last read in the metadata of the VN and may proceed with the read of the VN. Numerous determinations may be made when a VN is initially read before a CRP or EWP is allowed to proceed with fully reading the VN. For example, a denomination of the VN may be hidden until a successful check-in to the central system 150 is determined. Moreover, if the central system 150 responds with an indication that the VN has been cancelled, the CRP or EWP may be placed on a greylist or blacklist until the circumstances by which the lost VN has been recovered can be clarified.

Figure 5C:
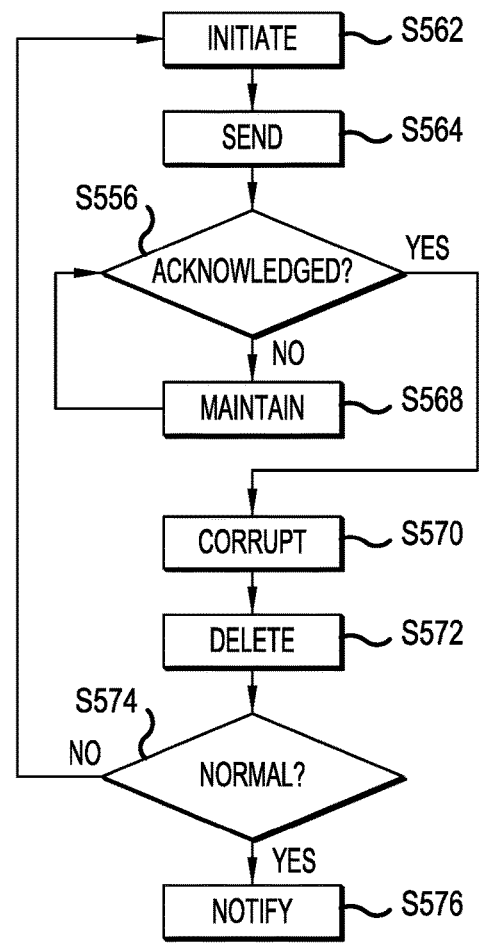
FIG. 5C jointly illustrates a method of transferring a VN in an outage mode and a method of deleting a transferred VN.

In the method of transferring a VN in an outage mode and the method of deleting a transferred VN in FIG. 5C, VNs may be automatically deleted once transferred away from an ECD. At S562, an ECD which holds a VN initiates an outage mode. The outage mode may be initiated automatically, such as when no broadband internet service is detected, or selectively at the discretion of a party. The outage mode may be specific to a CRP and/or an EWP, or may be implemented by the ECD as a whole. At S564, the ECD sends a VN to a counterparty. The VN may be sent via near field communication (NFC) or similar device-to-device transfer mechanisms that do not require broadband internet access to implement. The ECD may include an offline communication node configured to transfer virtual notes offline from the internet, such as an NFC module coupled to a secure memory. The VN may be transferred as part of an arrangement with a party using another ECD that is also in an outage mode. At S566, the ECD determines whether receipt of the VN has been acknowledged by the counterparty. For example, authorized CRPs and EWPs may automatically include programming to acknowledge receipt of VNs once the VNs are received or once the VNs are received and analyzed to ensure they include expected characteristics. If receipt is not acknowledged (S566=No), at S568 the ECD maintains the VN in storage, such as in a memory location where it was stored previous to being sent at S564. When receipt is acknowledged (S566=Yes), at S570 the ECD corrupts the VN at S570. For example, the ECD may randomly swap bits and bytes of the VN at the memory location where it is being maintained. Alternatively, the ECD may permanently erase a subset of the data of the VN by permanently erasing a subset of memory locations where the ECD maintains the VN. At S572, the ECD deletes the VN. For example, the ECD may move the VN to a garbage bin in memory, where deleted files are normally stored for a predetermined time or until a garbage bin is emptied. At S574, whether the ECD has returned to a normal mode is determined. For example, the ECD may automatically return to a normal mode when broadband internet service is detected, or may selectively return to a normal mode at the discretion of a party as long as broadband internet service is available. At S576, a central system is notified of the transfer. For example, records of all transfers of VN that occurred during an outage mode may be stored in a queue such as a register, and may be reported to a central system once broadband internet service is available. When the ECD is again online, transfer of the VNs may be reported via SFIOIs (i.e., reported via formatted inquiries or instructions). The central system may be notified of multiple different transfers at S576. Additionally, when the VN transferred from the ECD was itself received during an outage mode, the notification at S576 may include a notification of the transfer in which the VN was received. In some embodiments, metadata of a VN may be updated to include each transfer that occurs during an outage mode, so that an entire chain of transfers may be properly reported once broadband internet service is detected by a current holder of the VN.

As described with respect to FIG. 5C, VNs may be transferred even when no wide area network (WAN) communication services are available. An authorized CRP and/or an authorized EWP may provide an outage mode, that allows transfers of VNs either automatically when no wired or wireless internet service are detected, or selectively at the discretion of a party. An ECD may still be enabled to transfer a VN via near field communications (NFC) capabilities or similar device-to-device transfer mechanisms that do not require broadband internet access.

The deletion process from S554 to S572 may be the default process for handling VNs once they are transferred from an ECD, regardless of whether the ECD is in an outage mode, any mode analogous to an outage mode, or a normal operating mode.

In some embodiments, an EWP may have access to 1 or more accounts under which VNs may be stored and transacted, and may be configured to read and properly interpret the file of a VN. For any particular owner of VNs, an EWP may provide a list of VNs by denomination, unique IDs, and where the VNs are physically stored for the owner. For example, an EWP may access multiple accounts showing VN #1 and VN #2 are on a smartphone owned by the owner, VN #3 and VN #4 are stored in cloud storage by service provider #1 for the owner, VN #5 and VN #6 are stored under a checking account for the owner at bank #1, and VN #7 through VN #450 are stored under a savings account for the owner at bank #2. In some embodiments, the owner may use the EWP to transfer 1 or more VNs between accounts, download 1 or more VNs from the cloud, upload 1 or more VNs to the cloud, and otherwise physically move 1 or more VNs while also reporting as necessary to a central system as described herein.

Figure 5D:
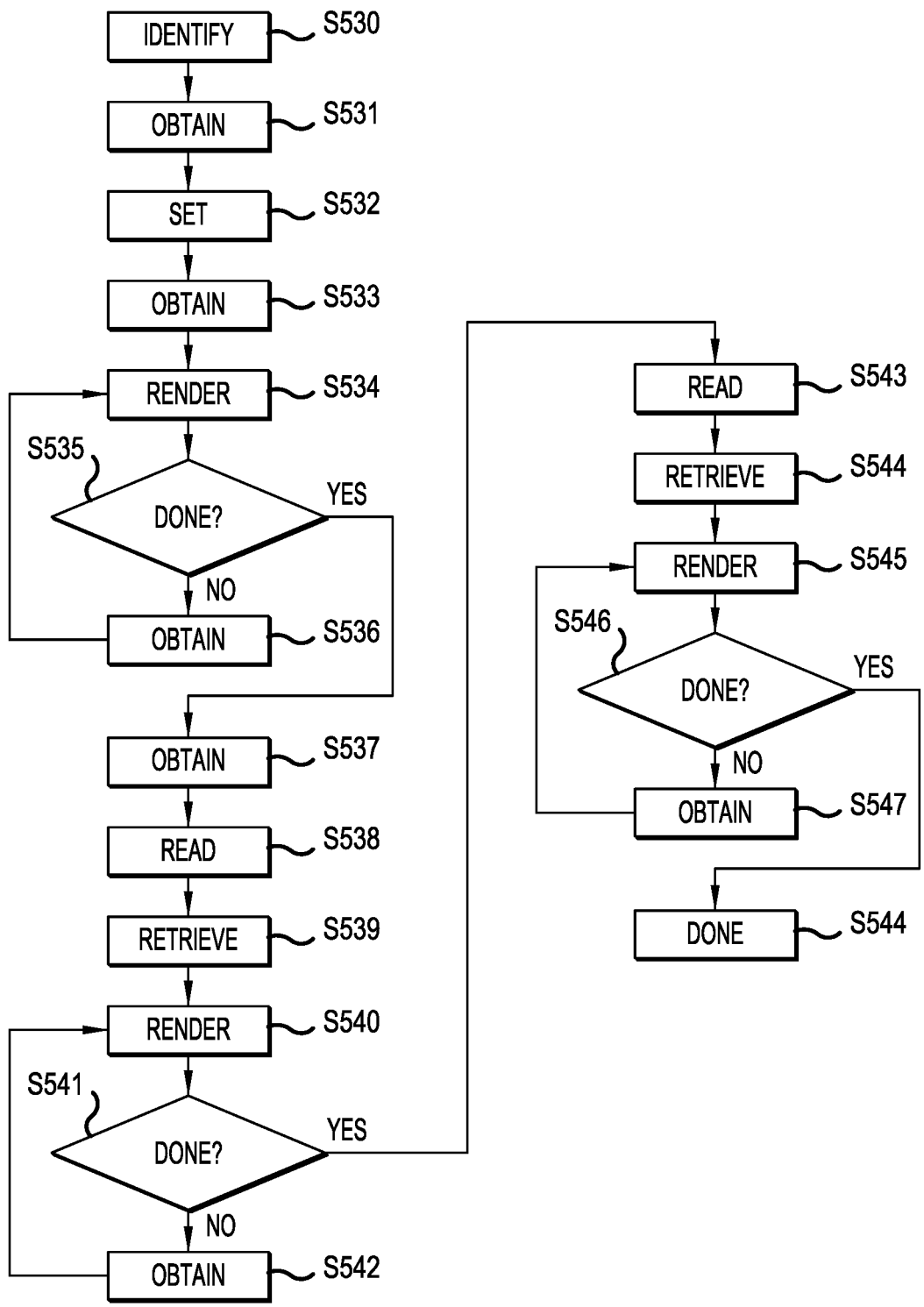
FIG. 5D illustrates a method of rendering a VN.

In the method of rendering a VN shown in FIG. 5D, rendering a VN starts with a template and also includes populating fields for variable information. At S530 a VN denomination is identified, such as from a denomination field sent as part of a VN, such as from data provided at a particular part of a data sequence for the VN. At S531, a fixed format for the VN denomination is obtained. A fixed format may include a template of fixed information. Different templates may be provided for different denominations. The fixed format may also include blank (unspecified) fields of locations for pixels which variable data will be used to fill. The fixed format for the VN may be obtained from a dedicated memory area which stores fixed formats for VNs. However, the fixed format for the VN may be retrieved over an ECN such as the internet from a public source, such as when an ECD has not previously stored the fixed format for the VN. At S532, a predominant color is set as a default for all pixel locations for the VN. For example, if a white offset pixel color is the predominant color, all pixel values may be assumed to be the value of the white offset unless and until otherwise specified. The predominant color may be the color most used for pixels for the VN. At S533, 1 or more starting addresses and a color are obtained. The starting addresses are the first or only address of sequential addresses of pixels with the color obtained at S533. For example, a first starting address may be row #1, column #1, and the same color may be used for 14 sequential pixels. In this example, the next starting address may be row #1, column #15, or column #1, row #15, depending on the addressing scheme. At S534, the pixels at the addresses from the starting address to the next starting address are rendered in the color obtained at S531. At S535, a determination is made whether rendering is done. If rendering is not done (S535=No), the next address(es) and color are obtained at S536, and the process returns to S534. If rendering is done (S535=Yes), variable data for the VN is obtained at S537. The variable data may be pixel addresses and colors to populate the blank fields of locations for pixels in the template, and/or may be logical data used to specify characters in the blank fields. At S538, unique ID characters are read from the variable data for the VN. The unique ID characters may be characters in the unique ID of the VN. At S539, addresses for the first character are retrieved. The addresses retrieved at S539 are again addresses of pixels. However, at S539 a color is not specified since characters for the VN may all be rendered in the same color and against the same background color. At S540, the pixels at the addresses for the character are rendered in the ID field(s) of the VN. In some embodiments, the unique ID of the VN may be rendered in multiple different locations in a visualization of the VN. For example, the unique ID may be rendered in the lower left and at the upper right. The same character may therefor be rendered at S540 in multiple locations. At S541, a determination is made again whether rendering is done. If rendering is not done (S541=No), the next address(es) for the next character are obtained at S542, and the process returns to S540. If rendering is done (S541=Yes), source/date/time data is read at S543. The source/date/time data may be any 1 or more logical data indicating the source of the VN, the date the VN was generated and/or the time the VN was generated. At S544, addresses for the source/date/time fields are retrieved. The addresses retrieved at S544 are again addresses of pixels, though again a color is not specified because the characters for the VN may all be rendered in the same color. At S545, the pixels at the address for the source/date/time fields are rendered in the source field, and the date and time field for the VN. At S546, a determination is made again whether rendering is done. If rendering is not done, the next address(es) for the source/date/time fields are obtained and the process returns to S545. If rendering is done (S548=Yes), the process is complete.

Although FIG. 5D shows the method primarily as a sequence with several repetitive loops, aspects of the method in FIG. 5D may be performed in parallel, or in different orders. For example, all 3 of the processes from S531 to S536, from S537 to S542, and from S543 to 5547 may be performed in parallel. Parallel sub-processes may be performed by different processors or different cores of one processor or multiple processors. The rendering of VNs may be optimized using templates for VN denominations which can be stored/pre-stored on devices which will render the VNs.

Defined data sets may be the core of VNs, whereas the entirety of a VN may comprise an application organized as a folder with multiple files including one or more files with the defined data set. The rendering of VNs described herein may be rendering of data in one file, whereas other files include data that is not rendered or renderable as a recognizable image. In addition to metadata that may be provided as a file separate from the defined data set, a file in an application and/or folder for a VN may be an encrypted file such as an encrypted version of the unique VN ID that can only be decrypted at the central system 150. The unique ID may also be provided in unencrypted form in a unique ID field and/or in a metadata field, as well as in an encrypted file and/or an encrypted version provided with other data. Examples of variable data that may be added, removed, or otherwise change for a VN include keys and metadata. Additionally, part or all of one or more files in a folder or application for a VN may comprise a lightweight database. The lightweight database may be activated by a triggering event such as a transfer of the VN or an automated report to the central system 150, such as to check in with an update to the central system 150. The lightweight database may include one or more line(s) of code that can be run and that record data in JSON format on a file within the application so that the data can easily be read by multiple different types of devices.

Moreover, even the rendering of VNs may differ on different devices that render the same VN. For example, devices may use a media query to select the definition for a VN that will be appropriate for each of the devices. Each VN may be able to provide different levels of interpolation and definition depending on the user choice and a device choice that reflects the device capability. A processor in a device may scan an entire image file and look for the instructions for the file format it has selected for rendering and display whatever is listed. This may be particularly important for mobile devices that are not smart phones or tablets and that do not have strong image processing capabilities but which can still be used to render some or all visualizable aspects of a VN.

Figure 5E:
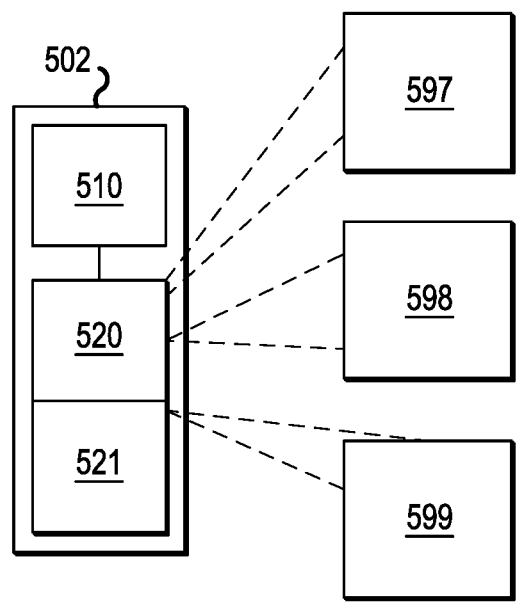
FIG. 5E illustrates another ECD.

In the ECD illustrated in FIG. 5E, a memory stores VN templates for different denominations. The ECD 502 includes a memory 520 that stores instructions, a processor 510 that executes the instructions, and a VN memory 521. The VN memory 521 may separately store VNs apart from the instructions of the memory 520 and, in some embodiments, in isolation from other types of data. The memory 520 stores 1 or more VN template(s) 597, a CRP 598 and an EWP 599. The VN template(s) may be stored as a complete set of all available VN template(s) for a digital currency, templates for only the most commonly used denominations of the digital currency, or only those templates selected for storage by a party using the ECD 502. Of course, when a party needs to obtain a template for a denomination that is not stored with the VN template(s) 597, the party may be able to easily obtain the missing template from a predetermined location over an ECN in order to render a visualization of the corresponding VN.

Figure 5F:
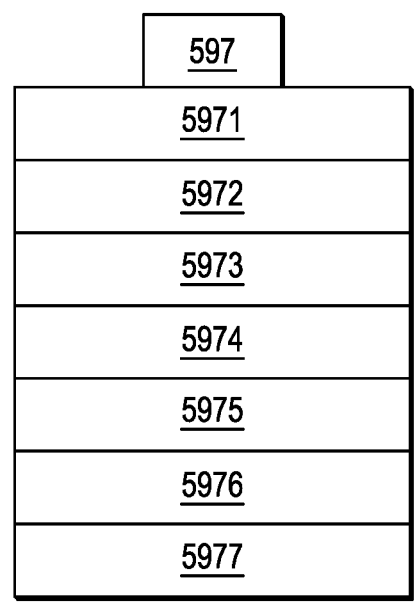
FIG. 5F illustrates a memory area of a memory in an ECD.

In the memory area of a memory in an ECD in FIG. 5F, the VN template(s) 597 are shown as being stored in a dedicated memory area. 7 templates are listed for 7 different denominations. The VN template(s) 597 include a first denomination template S971, a second denomination template S972, a third denomination template S973, a fourth denomination template S974, a fifth denomination template S975, a sixth denomination template S976, and a seventh denomination template S977. 7 denomination templates are shown in FIG. 5F since only 7 denominations are currently used for physical United States currency in dollar amounts. However, if the United States is to implement a digital currency, the digital currency could be easily envisioned to include more than 7 denominations each with a different design that can be rendered, or even a VN template for a variable denomination as proposed in a Federal Reserve technical paper published in February 2022. For example, the Unites States may implement a digital $500 VN, a digital $1000 VN, and even larger denominations of VNs.

Figure 5G:
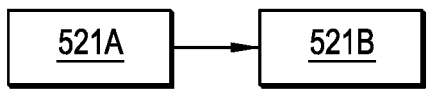
FIG. 5G illustrates a memory arrangement for storing VNs.

In the memory arrangement for storing VNs in FIG. 5G, VNs are stored in an active VN memory 521A when the VNs belong to a party using the device that includes the active VN memory 521A. The data sets of the VNs are transferred to a used VN memory 521B when the VNs are transferred to another party or even to another device of the same party.

Figure 5H:
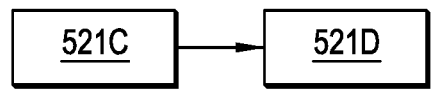
FIG. 5H illustrates a memory arrangement for storing records of VNs.

In the memory arrangement for storing records of VNs in FIG. 5H, ledger entries in a device that includes an active VN ledger 521C and a used VN ledger 521D are used to track which VNs belong to a party using the device and which VNs have been transferred to another party or even to another device of the same party.

Figure 5I:
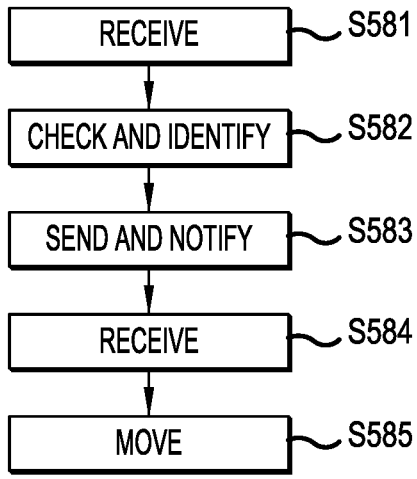
FIG. 5I illustrates a method of moving a VN between areas of a memory arrangement.
Figure 5J:
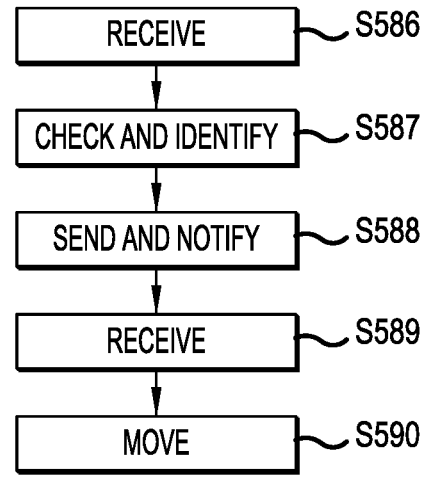
FIG. 5J illustrates a method of moving entries of records for VNs between areas of a memory arrangement.

In the method of moving a VN between areas of the memory arrangement in FIG. 5I, at S581, a payment instruction is received at the ECD that includes the active VN memory 521A. At S582, the active VN memory 521A is checked and a VN in the active VN memory 521A is identified for use in the payment. At S583, the VN is sent from the device and a central system is notified. At S584, an acknowledgement is received from the recipient of the VN and from the central system. At S585, the data set of the VN is moved from the active VN memory 521A to the used VN memory 521B.

In the method of moving entries of records for VNs between areas of a memory arrangement in FIG. 5I, at S586, a payment instruction is received at the device that includes the active VN ledger 521C. At S587, the active VN ledger 521C is checked and a VN corresponding to a ledger entry in the active VN ledger 521C is identified for use in the payment. At S588, the VN is sent from the device and a central system is notified. At S589, an acknowledgement is received from the recipient of the VN and from the central system. At S590, the ledger entry in the active VN ledger 521C is cancelled and a new ledger entry for the VN is created in the used VN ledger 521D.

Figure 5K:
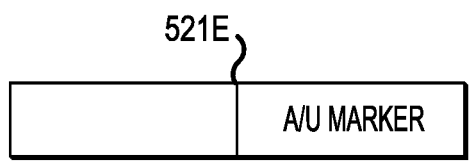
FIG. 5K and FIG. 5L illustrate different memory arrangements for storing VNs.

In the memory arrangement for storing VNs in FIG. 5K, a VN memory 521E includes a separate field for a device that includes the VN memory 521E to mark whether any data set for VNs stored in the device is active (A) or used (U). In this way, the device may check for active VNs to send when payment instructions are received.

Figure 5L:
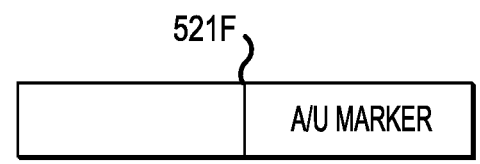

In the memory arrangement for storing VNs in FIG. 5L, each mark is an A/U marker, and may comprise binary data indicating either active (A) or used (U). A VN ledger 521F includes a separate field for a device that includes the VN ledger 521F to mark whether any ledger entry for VNs stored in the device is for an active VN (A) or a used VN (U). Each mark is an A/U marker, and may comprise binary data indicating either active (A) or used (U).

Figure 5M:
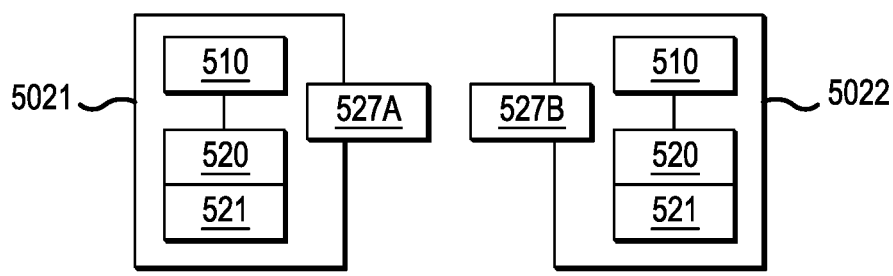
FIG. 5M illustrates ECDs between which a VN is transferred.

In the ECDs between which a VN is transferred in FIG. 5M, a first ECD S021 and a second ECD S022 exchange a VN. A port 527A in the first ECD S021 may be used to transfer the VN to a port 527B in the second ECD S022. The port 527A and the port 527B may be isolatable ports which can be used to transfer VNs.

In some embodiments, the first ECD S021 may be configured to virtualize the port 527A and the port 527B, and the second ECD S022 may be configured to allow the virtualization on a temporary basis as the port 527B is controlled by the first ECD S021. The virtualization may allow a first ECD to recognize 1 or more components of a second ECD temporarily as components of the first ECD, so that a data set of a VN being moved from the first ECD to the second ECD leaves no trace of the VN at the first ECD, other than a record that the VN was previously stored on the first ECD as described elsewhere herein. The virtualization may be considered analogous to the temporary creation of another drive on the first ECD S021, even though the port 527B is physically on the second ECD S022. Once the VN is moved to the second ECD S022, no trace of the VN is left at the first ECD S021, other than the record that the VN was previously stored on the first ECD.

A mount transfer protocol may reference inodes to transfer VNs from 1 hard drive to another in a virtualization process using the embodiment of FIG. 5M. The mount transfer protocol may apply to NFC, but may also apply to remote communications. For example, a remote mount protocol may be developed to transfer VNs between remote devices so that 1 device may temporarily have access to a hard drive of another hard drive for specific and limited purposes of transferring 1 or more VNs. Hard drives are or may be configured with a predetermined amount of inodes when they are formatted. The inodes are the actual locations of information, whereas paths to the inodes are readable by humans. When the path location of a file or folder, etc., changes on a singular hard drive, the inode does not. However if a file or folder is moved from 1 hard drive to another, the default procedure for a hard drive may be to move the file or folder to an unreserved inode on the new hard drive and to delete or otherwise destroy the inode left behind on the previous device. A mount transfer protocol will allow devices which include the hard drives to connect, physically or virtually, through NFC, physical connection, or internet, for a brief period of time to transfer the current VN inode on a hard drive of 1 device to a new inode on another hard device of another device. The copy of the VN left behind is deleted or otherwise destroyed by the default system design. The mount transfer protocol may be provided as a process by which 2 independent hard drives on different devices can connect momentarily and manage the transfer of a VN from a host inode to a recipient inode on a foreign device.

Figure 5N:
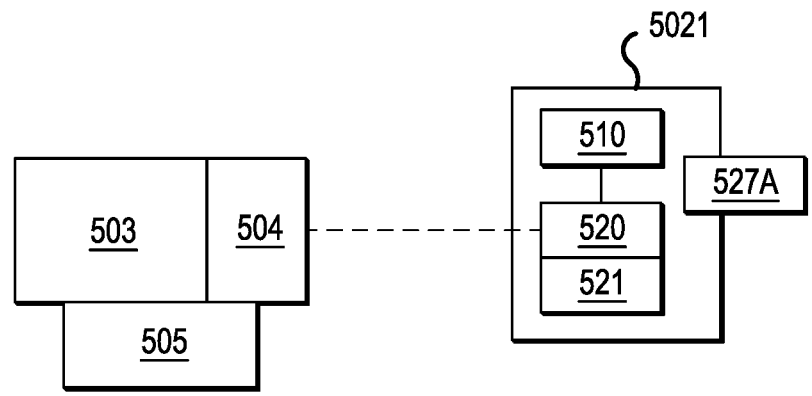
FIG. 5N illustrates offline storage of VNs.

In the offline storage of VNs illustrated in FIG. 5N, an offline storage device 503 includes a first interface 504 and a second interface 505. The offline storage device 503 may be a detachable accessory that stores VNs and that limits removal of VNs to a particular ECD and, in some embodiments, to a particular user. The offline storage device 503 may lack an interface to wired or wireless wide area networks (WANs), and instead may only be configured to obtain VNs from other devices which include access to wireless or wired wide area networks. The first interface 504 may be an interface to a first ECD S021, such as a wired interface configured to accept USB cables, HDMI cables, and/or other forms of wired connections to the first ECD S021 or a wireless interface configured to communicate wirelessly, such as by NFC. As an example, the offline storage device 503 may be a small, inexpensive, and ubiquitous cold storage device. The offline storage device 503 may be provided in multiple different shapes, colors, and exterior materials so as to be easily carried without being noticeable. The second interface 505 may be a biometric interface such as a fingerprint reader. The offline storage device 503 may be configured to accept a fingerprint 1 time and then use the fingerprint from then on so that only the initial party can access the second interface 505 using the fingerprint. In some embodiments, the offline storage device 503 is trackable, such as each time the offline storage device 503 connects to a networked ECD. The offline storage device 503 may check-in to a central system, particularly when the offline storage device 503 is storing VNs being tracked by the central system.

Figure 5O:
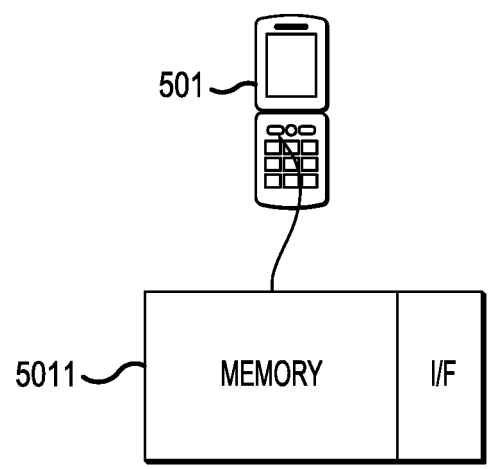
FIG. 5O illustrates a secure memory for handling VNs.

In the secure memory for handling VNs in FIG. 5O, a secure memory S011 may be a module configured to attach to a legacy mobile phone or a smart phone. Secure memory S011 is an example of a low-cost module which may be provided for users who do not wish to store VNs or other types of information related to their use of digital currencies on their ECDs. In some embodiments, the secure memory S011 may be tied to individuals by a biometric such as a fingerprint, and may be tied to ECDs such as the mobile ECD 501. For example, the first time the secure memory S011 is used by a user, the secure memory S011 may collect a biometric such as a fingerprint from the user, and then interact with the mobile ECD 501 to coordinate a fixed arrangement by which the secure memory S011 can only be used with the mobile ECD 501.

A VN may be provided as a folder that includes several files, may be visually rendered based on several different files within a folder working together, and may be read by an authorized CRP or EWP. For example, a VN may include a relatively small amount of data including image data, variable data and so on. Some of the use data stored as metadata for a VN may be provided as a separate encrypted file with JSON or BSON data, and may be transmitted to the central systems described herein via an application programming interface (API). The use data may be captured and stored in data fields within the JSON/BSON file. After transmission to the central systems described herein, the central systems may send a signal via an API back to the device where the VN is stored, and the signal may indicate that the data in the JSON/BSON file has been stored at the central system and can be deleted from the device where the VN is stored, thereby reducing the amount of data sent with the VN as the VN is transferred. A VN and/or API may be configured to communicate via a specific port of a server or database in a data center to notify with updates, and this also may reduce the workload at the central systems described herein. 1 or more types of SFIOIs described herein may include the JSON/BSON updates.

Figure 6:
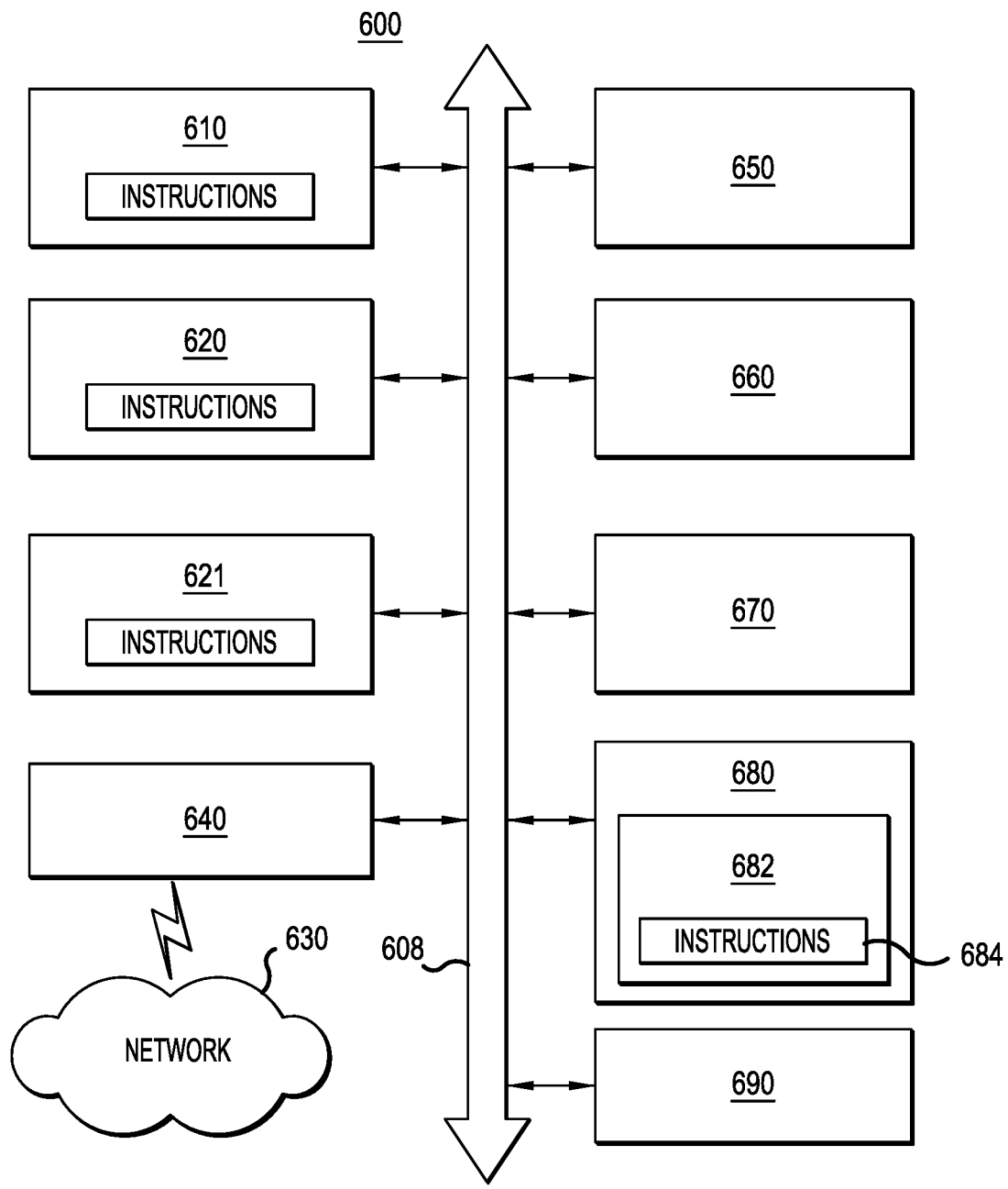
FIG. 6 illustrates a computer system.

The computer system of FIG. 6 may include features used by ECDs used by users, intermediaries and the central systems described herein. However, a "computer" as described herein may be implemented with less than the set of components of FIG. 6, such as by at least a memory and processor combination. The computer system 600 includes a set of software instructions that can be executed to cause the computer system 600 to perform any of the methods or computer-based functions disclosed herein. The computer system 600 may operate as a standalone device or may be connected to other computer systems or peripheral devices. In embodiments, a computer system 600 performs logical processing based on digital signals received via an analog-to-digital converter.

As illustrated in FIG. 6, the computer system 600 includes a processor 610. The processor 610 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 610 is an article of manufacture and/or a machine component. The processor 610 is configured to execute software instructions to perform functions as described in the various embodiments herein. The processor 610 may be a general-purpose processor or may be part of an application specific integrated circuit (ASIC). The processor 610 may also be a microprocessor, a microcomputer, a processor chip, a controller, a microcontroller, a digital signal processor (DSP), a state machine, or a programmable logic device. The processor 610 may also be a logical circuit, including a programmable gate array (PGA), such as a field programmable gate array (FPGA), or another type of circuit that includes discrete gate and/or transistor logic. The processor 610 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 600 further includes a main memory 620 and a static memory 621, where memories in the computer system 600 communicate with each other and the processor 610 via a bus 608. Memories described herein are tangible storage mediums for storing data and executable software instructions and are non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The main memory 620 and the static memory 621 are articles of manufacture and/or machine components. The main memory 620 and the static memory 621 are computer-readable mediums from which data and executable software instructions can be read by a computer (e.g., the processor 610). Each of the main memory 620 and the static memory 621 may be implemented as 1 or more of random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. The memories may be volatile or non-volatile, secure and/or encrypted, unsecure and/or unencrypted.

As shown, the computer system 600 further includes a video display unit 650, such as a liquid crystal display (LCD), an organic light emitting diode (OLED), a flat panel display, a solid-state display, or a cathode ray tube (CRT), for example. Additionally, the computer system 600 includes an input device 660, such as a keyboard/virtual keyboard or touch-sensitive input screen or speech input with speech recognition, and a cursor control device 670, such as a mouse or touch-sensitive input screen or pad. The computer system 600 also optionally includes a disk drive unit 680, a signal generation device 690, such as a speaker or remote control, and/or a network interface device 640.

In an embodiment, as depicted in FIG. 6, the disk drive unit 680 includes a computer-readable medium 682 in which 1 or more sets of software instructions 684 (software) are embedded. The sets of software instructions 684 are read from the computer-readable medium 682 to be executed by the processor 610. Further, the software instructions 684, when executed by the processor 610, perform 1 or more steps of the methods and processes as described herein. In an embodiment, the software instructions 684 reside all or in part within the main memory 620, the static memory 621 and/or the processor 610 during execution by the computer system 600. Further, the computer-readable medium 682 may include software instructions 684 or receive and execute software instructions 684 responsive to a propagated signal.

FIG. 7A illustrates a method of withdrawing VNs from an account to an ECD. FIG. 7B illustrates a method of facilitating withdrawal of VNs by a bank. FIG. 7C illustrates a method of a central system confirming a transfer of VNs from a bank to an ECD. The methods of FIG. 7A, FIG. 7B and FIG. 7C describe how current automated teller machines (ATMs) may be replaced by functionality for VNs. The methods of FIG. 7A, FIG. 7B and FIG. 7C are integrated together as reflected by the sequential numbering of each step implemented by the ECD, the bank systems and the central system as shown in these FIGs. and as described below.

At S701, an application that enables a party to withdraw VNs from a bank account electronically is opened on an ECD, and the party logs in such as by entering a username and password. At S702, the ECD is used to select a bank and an account at the selected bank, and a withdrawal option, and denominations and a total amount to withdraw. At S703, the bank systems receive the withdrawal request and denominations and the total requested to be withdrawn. At S704, the bank systems notify the central system 150. At S705, the central system 150 receives the notification from the bank, and notifies the ECD. At S706, the ECD receives a notification from the central system, and sends confirmation to the central system 150. At S707, the central system receives the confirmation from the ECD and notifies the bank of the confirmation from the ECD. At S708, the bank receives the notification from the central system. At S709 the bank sends the VNs to the ECD. The data sets of the VNs that are transferred may be the full data sets including all image data, all metadata, and all other types of data, or may include only selected data such as variable data used to populate a template for the denomination of(s) the VNs. At S710, the ECD receives the VNs from the bank and stores the VNs. The VNs are stored in a secure storage, either at the ECD or at an accessory for the ECD. At S711 the ECD inspects the VNs, such as by checking that specific types of data exist at the proper locations. In some embodiments, the ECD may render the VNs so that the party can visually inspect the VNs to confirm the appearance of the VNs. At S712, the ECD confirms receipt of the VNs to the central system 150. The confirmation of receipt may be conditioned on satisfactory results from the inspection of the VNs at S711. At S713, the central system receives confirmation of receipt of the VNs from the ECD and notifies the bank. At S714, the bank receives notification from the central system of the satisfactory receipt of the VNs by the ECD, and debits an account balance for the appropriate user account to reflect that the VNs have been transferred to the ECD.

In the system for storing VNs in an accessory to an ECD in FIG. 7D, an ECD 701a communicates with an NFC storage device 751a. The ECD 701a and the NFC storage device 751a communicate via near field communications (NFC). The NFC storage device 751a may be used to store VNs offline. Additionally, the NFC storage device 751a may be used to store the application by which the ECD requests withdrawal of the VNs from the bank in FIG. 7A, FIG. 7B and FIG. 7C. In some embodiments, the ECD 701a may provide the NFC carrier signal for the NFC storage device 751a and another NFC storage device to communicate with one another. For example, one NFC storage device may be used to store 1 or more applications used to access financial accounts, and another NFC storage device may be used to store VNs and other valuable data sets such as passwords. In some embodiments, NFC storage devices may be configured to communicate only with the ECD 701a, and otherwise may require a preset override password or other code in order to communicate with another ECD.

Parties may also wish to obfuscate the ability of an ECD 701a and/or NFC storage device 751a to retrieve or store VNs. Therefore, the NFC storage device 751a or another NFC storage device may store an application used to retrieve or send VNs, and may be configured to store retrieved VNs. When an ECD 701a retrieves the application from the NFC storage device 751a and uses the application to retrieve the VNs from the bank, the ECD 701a may not retain any record reflecting the retrieval or the VNs once the retrieval is complete and the VNs are stored on the NFC storage device 751a.

An example implementation using NFC or an alternative wireless arrangement is for a vending machine that provides a good in exchange for receipt of a VN. The vending machine may even provide change for the VN when the price for the good is less than the value of the VN being offered. In this example, the vending machine may be equipped to wirelessly interact with an NFC card or NFC device such as a smartphone or accessory to a smartphone. The vending machine may obtain the unique ID of the VN, confirm ownership of the VN with a central system such as the central system 150, exchange the good for the VN and provide change, and then immediately send the VN over an ECN to a private secure storage. Either the vending machine or the private secure storage may also inspect the VN to ensure that the data arrangement conforms to standards such that, for example, the VN may be rendered. The VN in this example may include a full data set that can be used to entirely populate a rendered VN on a screen, or may include variable information that can be used to populate a template so as to render the VN on a screen.

Another example implementation using NFC or an alternative wireless arrangement is for a change machine that provides change in exchange for receipt of a VN. The change machine may be equipped to wirelessly interact with an NFC card or NFC device such as a smartphone or accessory to a smartphone. The change machine may obtain the unique ID of the VN, confirm ownership of the VN with a central system such as the central system 150, exchange the change for the VN, and then immediately send the VN over an ECN to a private secure storage. Either the change machine or the private secure storage may also inspect the VN to ensure that the data arrangement conforms to standards such that, for example, the VN may be rendered. The VN in this example may include a full data set that can be used to entirely populate a rendered VN on a screen, or may include variable information that can be used to populate a template so as to render the VN on a screen. A similar example implementation using NFC is for a token machine such as at an arcade, wherein the token machine provides usable tokens that can be accepted by video games or other electronic entertainment systems, and wherein the token machine is configured to exchange the tokens for a VN in a manner similar to which the change machine is configured to exchange the change for a VN.

In the system for storing VNs in an accessory to an ECD in FIG. 7E, the ECD 701b and the ported storage device 751b communicate via a wired connection. The wire 727a has a first adapter 727b configured to connect into a port of the ECD 701a and a second adapter 727c configured to connect into a port of the ported storage device 751b. In an alternative configuration, the ECD 701b may modularly connect or otherwise combine with the ported storage device 751b, in a manner similar to a memory chip inserting into a port dedicated to receiving the memory card.

The use of encryption has been described for specific embodiments and purposes herein. However, the use of encryption mechanisms such as SSL may be assumed for transmission of VNs in most or perhaps all communications. To the extent that different mechanisms for encryption may be used for handling of VNs, the teachings herein should not be considered particularly inconsistent with use of any particular encryption in appropriate circumstances.

Although VNs are primarily described herein as files that are exclusively read-only, VNs in user and intermediary implementation mechanisms for digital currencies are not limited to read-only files. For example, one or more exceptions to a read-only parameter for a file for a VN may be provided to automatically modify a VN, such as to designate that an unauthorized attempt has been made to modify the VN or to process the VN with an unauthorized program. As an example, CRPs and EWPs may include a subroutine to automatically change a particular bit or byte at a predetermined fixed address of a VN, such as from 0 to 1 or from 1 to 0, when any attempt to modify the VN is detected. Another subroutine may check for the value at the predetermined fixed address when the VN is read, and may report the attempt to modify the VN to the central system 150. As a result, the central system 150 may place the current holder of the VN on a blacklist, or may offer to exchange the corrupted VN with another VN of equivalent value.

Although centralized tracking for digital currencies has been described with respect to VNs, the teachings herein are not limited in applicability to VNs or any particular digital currency authorized by a government or issued by or on behalf of a central bank. Rather, various aspects of the teachings herein may be implemented for other forms digital currencies including stablecoins and other forms of cryptocurrencies, as well as other forms of digital tokens that are used as mediums of value, including digital currencies that do not share one or more characteristics of VNs as described herein.

Although centralized tracking for digital currencies has been described with reference to several exemplary embodiments, it is understood that the words that have been used are words of description and illustration, rather than words of limitation. Changes may be made within the purview of the appended claims, as presently stated, and as amended, without departing from the scope and spirit of centralized tracking for digital currencies in its aspects. Although centralized tracking for digital currencies has been described with reference to particular means, materials and embodiments, centralized tracking for digital currencies is not intended to be limited to the particulars disclosed; rather centralized tracking for digital currencies extends to all functionally equivalent structures, methods, and uses such as are within the scope of the appended claims.

Although the present specification describes components and functions that may be implemented in particular embodiments with reference to particular standards and protocols, the disclosure is not limited to such standards and protocols. For example, insofar as a legal framework for implementing digital currencies is not yet in place in the United States or Europe, standards compliant with such legal standards may be developed in the future and are expected to implement one or more of the mechanisms described herein.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. An electronic communication device (ECD), comprising:
   a memory that stores software instructions; a processor that executes the software instructions; and an offline communication node, wherein, when executed by the processor, the software instructions cause the ECD to:
   generate and assemble the packets, formatted according to a required packet format for formatted inquiries and formatted instructions for virtual notes of a national digital currency, and including a unique identifications uniquely identifying virtual notes which are a subject of the formatted inquiries and formatted instructions and a unique identification uniquely identifying a purported owner of the virtual notes which are the subject of the formatted inquiries and formatted instructions;

send packets, formatted according to a required packet format for formatted inquiries and formatted instructions for virtual notes of a national digital currency, as unsequenced communications to a central system that is configured to track all instances of virtual notes of the national digital currency and that is configured to verify ownership of the virtual notes specified in the formatted inquiries and formatted instructions;

receive, from the central system, responses to the packets formatted according to the required packet format for formatted inquiries and confirmations of the packets formatted according to the required packet format for formatted instructions when the formatted inquiries and formatted instructions comply with the required packet format as required by the central system and processing the formatted inquiries and formatted instructions, transfer, via the offline communication node, virtual notes offline from the internet, and the transfer of the virtual notes is reported via formatted instructions when the ECD is again online; and complete, by the processor executing the software instructions, transactions based on responses from the central system indicating confirmation of ownership of each virtual note specified in the packets by the purported owners specified in the packets.

2. The electronic communication device of claim 1, wherein the virtual notes comprise variable data that varies for each virtual note of the national digital currency, and
wherein, when executed by the processor, the software instructions cause the ECD further to generate a display of a virtual note using a default template that is populated with the variable data for the virtual note.

3. The electronic communication device of claim 1,
wherein the memory comprises a secure memory divided between a first area for virtual notes transferred to the ECD and not transferred away from the ECD, and a second area for virtual notes transferred away from the ECD.

4. The electronic communication device of claim 1,
wherein, when executed by the processor, the software instructions cause the ECD further to:
retrieve virtual notes from a service provider without the ECD generating and sending a formatted instruction to the central system to report retrieving the virtual notes.

5. The electronic communication device of claim 1, further comprising:
an interface configured to connect to a detachable accessory that stores virtual notes and that limits removal of the virtual notes to the ECD.

6. A communication method for an electronic communication device (ECD) that includes a memory that stores software instructions, and a processor that executes the software instructions, and an offline communication node, the communication method comprising:
generating and assembling the packets, formatted according to a required packet format for formatted inquiries and formatted instructions for virtual notes of a national digital currency, and including a unique identifications uniquely identifies virtual notes which are a subject of the formatted inquiries and formatted instructions and a unique identification uniquely identifies a purported owner of the virtual notes which are the subject of the formatted inquiries and formatted instructions;

sending packets, formatted according to a required packet format for formatted inquiries and formatted instructions for virtual notes of a national digital currency, as unsequenced communications to a central system that is configured to track all instances of virtual notes of the national digital currency and that is configured to verify ownership of the virtual notes specified in the formatted inquiries and formatted instructions;

receiving, from the central system, responses to the packets formatted according to the required packet format for formatted inquiries and confirmations of the packets formatted according to the required packet format for formatted instructions when the formatted inquiries and formatted instructions comply with the required packet format as required by the central system and processing the formatted inquiries and formatted instructions, transferring, via the offline communication node, virtual notes offline from the internet, and the transfer of the virtual notes is reported via formatted instructions when the ECD is again online; and completing, by the processor executing the software instructions, transactions based on responses from the central system indicating confirmation of ownership of each virtual note specified in the packets by the purported owners specified in the packets.

7. The communication method of claim 6,
wherein the virtual notes comprise variable data that varies for each virtual note of the national digital currency, and
wherein the communication method further comprises generating a display of a virtual note using a default template that is populated with the variable data for the virtual note.

8. The communication method of claim 6,
wherein the memory comprises a secure memory divided between a first area for virtual notes transferred to the ECD and not transferred away from the ECD, and a second area for virtual notes transferred away from the ECD.

9. The communication method of claim 6, further comprising:
retrieving virtual notes from a service provider without the ECD generating and sending a formatted instruction to the central system to report retrieving the virtual notes.

10. The communication method of claim 6, further comprising:
storing virtual notes in a detachable accessory that limits removal of the virtual notes to the ECD.

\* \* \* \* \*

UNITED STATES PATENT AND TRADEMARK OFFICE
CERTIFICATE OF CORRECTION

| | |
|---|---|
| PATENT NO. | : 12,282,904 B2 |
| APPLICATION NO. | : 18/276997 |
| DATED | : April 22, 2025 |
| INVENTOR(S) | : Joshua M. Povsner and Duncan Parker |

It is certified that error appears in the above-identified patent and that said Letters Patent is hereby corrected as shown below:

In the Claims

In Column 32, at Line 62, Claim 1, "generate and assemble the packets" is changed to --generate and assemble packets--

In Column 32, at Line 65, Claim 1, "and including a unique identifications" is changed to --and including unique identifications--

In Column 33, at Line 4, Claim 1, "send packets, formatted according to a required" is changed to --send the packets, formatted according to the required--

In Column 33, at Line 6, Claim 1, "of a national digital" is changed to --of the national digital--

In Column 33, at Lines 18-19, Claim 1, "by the central system and processing the formatted inquiries and formatted instructions," is changed to --by the central system;--

In Column 33, at Line 21, Claim 1 "and the transfer of the virtual" is changed to --wherein transfer of the virtual--

In Column 33, at Line 55, Claim 6, "and a processor" is changed to --a processor--

In Column 33, at Line 58, Claim 6, "generating and assembling the packets" is changed to --generating and assembling packets--

In Column 34, at Lines 2-3, Claim 6, "and including a unique identifications uniquely identifies" is changed to --and including unique identifications that uniquely identify--

In Column 34, at Line 5, Claim 6, "a unique identification uniquely identifies a purported" is changed to --a unique identification that uniquely identifies a purported--

Signed and Sealed this
Fourteenth Day of October, 2025

John A. Squires
*Director of the United States Patent and Trademark Office*

CERTIFICATE OF CORRECTION (continued)
U.S. Pat. No. 12,282,904 B2

In Column 34, at Line 8, Claim 6, "sending packets, formatted according to a required" is changed to --sending the packets, formatted according to the required--

In Column 34, at Line 10, Claim 6, "of a national digital" is changed to --of the national digital--

In Column 34, at Lines 23-24, Claim 6, "by the central system and processing the formatted inquiries and formatted instructions," is changed to --by the central system;--

In Column 34, at Line 26, Claim 6, "and the transfer of the" is changed to --wherein transfer of the--